US010574698B1

(12) United States Patent
Sharifi Mehr

(10) Patent No.: US 10,574,698 B1
(45) Date of Patent: Feb. 25, 2020

(54) CONFIGURATION AND DEPLOYMENT OF DECOY CONTENT OVER A NETWORK

(71) Applicant: Amazon Technologies, Inc., Seattle, WA (US)

(72) Inventor: Nima Sharifi Mehr, Vancouver (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 201 days.

(21) Appl. No.: 15/694,562

(22) Filed: Sep. 1, 2017

(51) Int. Cl.
*G06F 12/14* (2006.01)
*H04L 29/06* (2006.01)

(52) U.S. Cl.
CPC ...... *H04L 63/1491* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 9,985,988 | B2* | 5/2018 | Gukal | H04L 41/12 |
| 2006/0018466 | A1* | 1/2006 | Adelstein | H04L 63/1425 380/46 |
| 2006/0101515 | A1* | 5/2006 | Amoroso | H04L 29/12009 726/23 |
| 2006/0101516 | A1* | 5/2006 | Sudaharan | H04L 63/0263 726/23 |
| 2014/0096229 | A1* | 4/2014 | Burns | H04L 63/1491 726/15 |
| 2017/0134423 | A1* | 5/2017 | Sysman | G06F 21/554 |

* cited by examiner

*Primary Examiner* — Brandon S Hoffman
(74) *Attorney, Agent, or Firm* — Quarles & Brady LLP

(57) ABSTRACT

Systems and methods are provided for configuring and deploying decoy content over a network. The methods generate decoy content, including identifying information, based on information about network traffic in a virtual network associated with a user. Cause the decoy content to be sent in the virtual network. Determine, based at least in part on the identifying information, that at least the portion of the decoy content was used. In response to determining that the portion of the decoy content was used, alert the user that the decoy content was used.

20 Claims, 7 Drawing Sheets

US 10,574,698 B1

CONFIGURATION AND DEPLOYMENT OF DECOY CONTENT OVER A NETWORK

BACKGROUND

In general, computing devices can utilize a communication network, or a series of communication networks, to exchange data. Companies and organizations often operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, sometimes referred to herein as a "data center," may include a number of interconnected computing systems to provide computing resources to users of the data center. The data centers may be private data centers operated on behalf of an organization, or public data centers operated on behalf of, or for the benefit of, the general public.

To facilitate increased utilization of data center resources, virtualization technologies can allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices can be associated with different combinations of operating systems or operating system configurations, virtualized hardware resources and software applications to enable a computing device to provide different desired functionalities, or to provide similar functionalities more efficiently. Further, virtual machines can themselves be partitioned into multiple isolated virtual systems, sometimes referred to as "containers." The virtual machine controls allocation of resources such as processing power and memory, and each container has its own process and network space in which the container may, for example, execute software programs. In such a system, a service provider may provide virtual machine resources to many different users, and can operate disparate physical computing devices that communicate with each other and with external resources over any number of networks and subnetworks of varying types.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
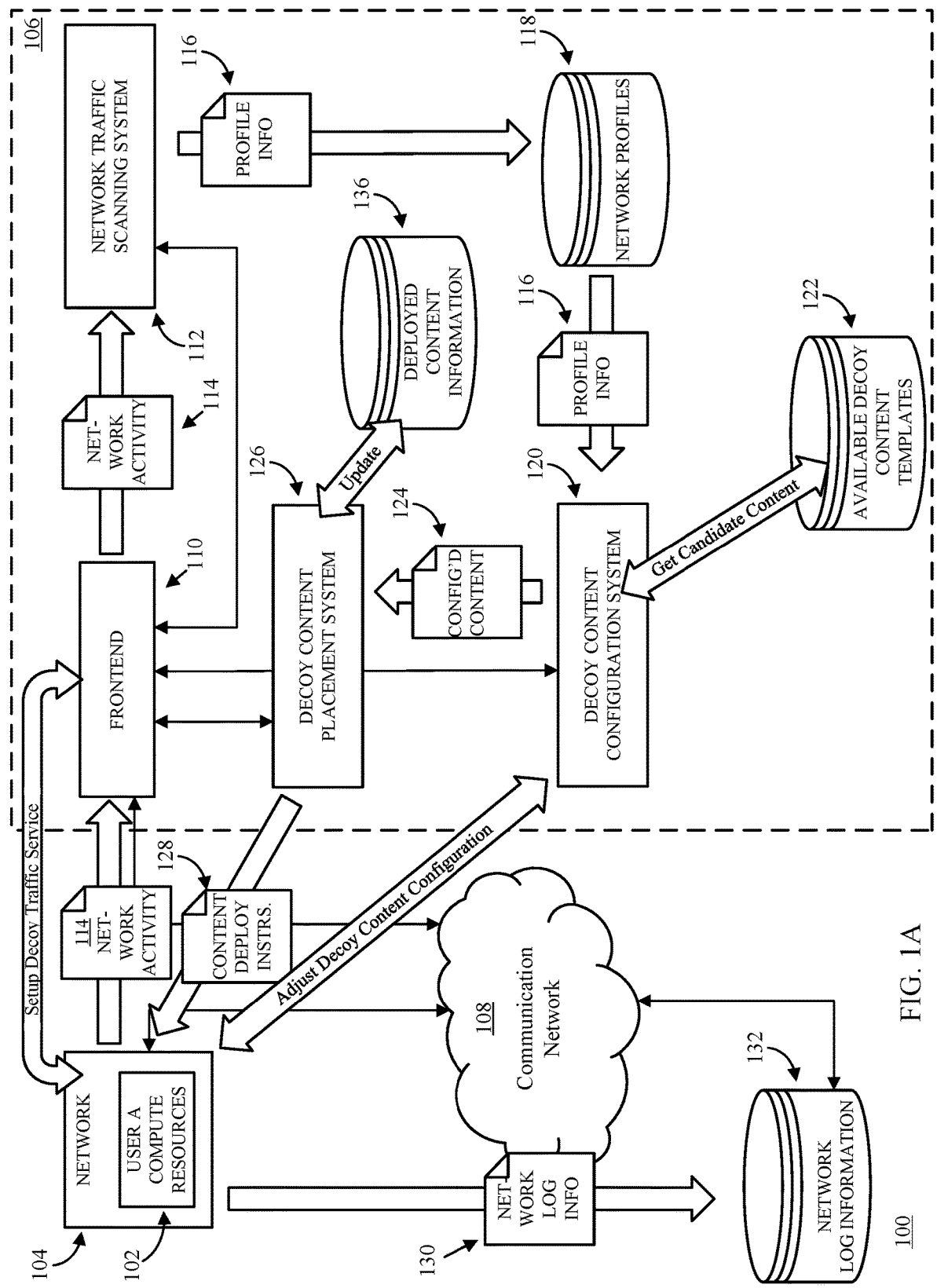
FIG. 1A is a diagram of an example system for configuring and deploying decoy content over a network in accordance with some embodiments of the disclosed subject matter.

A service provider can supply computing resources to developers and/or other users that can use the computing resources to provide computing environments, such as a virtual network, that can be used to perform computing operations (e.g., providing access to web pages, applications, services, a database, etc.). As with networked physical computing systems, such as personal computers, servers, data centers, etc., such systems may be the target of malicious user's attempting to infiltrate the networked devices, and/or misappropriate information sent to and/or from the networked devices. Users of networked computing systems (whether physical, virtual, or a combination thereof) can implement some security measures to attempt to mitigate infiltration of the computing devices in the network, such as implementing security rules to attempt to prevent infiltration, or deploying honeypots to distract and/or attempt to monitor infiltrations. Accordingly, compute resources provided as a service may benefit monitoring and/or countermeasures to attempt to protect user's systems from potentially malicious activity.

However, other types of attacks may attempt to misappropriate content sent to and/or from the user's computing devices without needing to actually infiltrate the network. For example, in a "man-in-the-middle" attack, the attacker may attempt to intercept information sent to and/or from the user's computing device(s). In such an attack, the attacker can intercept information without needing to actually infiltrate the user's network, potentially making detection of such attacks more difficult. In some cases, the service provider associated with the computing resources may wish to offer security services in connection with the computing resources and other networking infrastructure provided to users. For example, the service provider may offer a service that sends decoy content that includes identifying information over a portion of a network associated with the user. In such an example, the service provider can detect the identifying information in other communications to determine that a particular communication channel over which the decoy content was sent may be compromised.

In some embodiments, the decoy content can be configured to appear to be similar to other content sent over the user's network, and can be deployed using communication channels that a typical user interacting with the user's network would be unlikely to access. Additionally, the decoy content can be transmitted using a protocol that has relatively lax security measures, or by making the content appear to be content that attackers are often interested in intercepting. In some cases, the decoy content can draw at least a portion of an attacker's attention from other content being communicated over the user's network. Detection of a content item (e.g., login credentials, a gift card number, etc.) that was included in the decoy content can indicate that the decoy content was likely intercepted by an attacker. When the content item is detected, the system can alert the user that an attacker may have intercepted content being transmitted over at least a portion of the user's network. The user may then take steps to investigate how the attacker intercepted the content and secure the network. Additionally, an attacker may waste time and/or effort intercepting and deciphering the decoy content, which may reduce the amount of time and/or effort spent by the attacker in attempting to access non-decoy content transmitted over at least a portion of the user's network.

However, generating decoy content that is not easily detectable by malicious users can be a difficult and time consuming task. For example, an attacker may become suspicious if the content that is being intercepted is repetitive, or not in a format that the attacker would expect based on the source and/or destination of the content. As another example, if the decoy content is not sufficiently customized, attackers may begin to recognize some property of the decoy content that gives away that the content that is being intercepted is decoy content.

Accordingly, it would be advantageous if the service provider could analyze the traffic being sent over at least a portion of the user's network or stored in a repository, and generate decoy content for use with the user's network. The present disclosure describes a system for configuring and deploying decoy content. As described below, the system for configuring and deploying decoy content can receive a request from a user to analyze traffic being transmitted over at least a portion of the user's network, and can generate decoy content based on the analysis of the traffic. For example, the system for configuring and deploying decoy content over a network can be associated with a service that the user can interact with to transmit decoy content over at least a portion of the user's network. In a more particular example, the user can submit a request to begin a process for configuring and transmitting decoy content over at least a portion of a virtual network associated with the user to an application program interface ("API") associated with the service for configuring and deploying decoy content over a network. In such an example, the user can be required to explicitly grant permission to the system for configuring and deploying decoy content over a network to build a profile of a portion of traffic over at least a portion of the user's network that the user wishes to monitor using decoy content. Additionally, in some embodiments, the user can be required to explicitly grant permission to the system for configuring and deploying decoy content over a network to make changes to the configuration of the user's compute resources in order for the system to be permitted to profile network traffic on at least a portion of the user's network (e.g., by performing a scan) and/or to deploy agents and/or honeypots configured to send decoy content over at least a portion of the user's network.

In some embodiments, the system for configuring and deploying decoy content over a network can create a profile of at least a portion of the user's network by scanning traffic transmitted over at least the portion of the user's network. For example, the system for configuring and deploying decoy content over a network can retrieve log information about traffic to and/or from computing devices in at least a portion of the user's network. As another example, the system for configuring and deploying decoy content over a network can cause one or more agents to be installed on hosts in the user's network (e.g., virtual machine instances, servers, clients, etc.) that can monitor traffic to and/or from the host, and send information about the monitored traffic to the system for configuring and deploying decoy content over a network. As yet another example, the system for configuring and deploying decoy content over a network can cause one or more hosts to be integrated into the user's network to act as a proxy for at least a portion of the traffic sent over the user's network. In such an example, the proxy can monitor traffic that is relayed through the proxy, and send information about the monitored traffic to the system for configuring and deploying decoy content over a network. As still another example, the system for configuring and deploying decoy content over a network can request information about the types of communication protocols used in the user's network.

In some embodiments, after generating profile information about at least a portion of the user's network, the system for configuring and deploying decoy content over a network can use the profile information to select decoy content from a repository of template decoy content that is similar to the content sent over the user's network. For example, the system for configuring and deploying decoy content over a network can select preconfigured decoy content templates that contain similar information to information included in content transmitted over the user's network. As another example, the system for configuring and deploying decoy content over a network can select preconfigured decoy content templates that are associated with similar types of applications.

In some embodiments, after selecting preconfigured decoy content templates, the system for configuring and deploying decoy content over a network can further configure the decoy content with details that can make the content appear to be more plausible. For example, the system for configuring and deploying decoy content over a network can add details such as login credentials, names, dates, social security numbers, credit card numbers, gift card numbers, account numbers, amounts, etc., that are relatively similar in character to details included in content sent over the user's network. In such an example, some of the details that are added (e.g., credentials, names, social security numbers, credit card numbers, gift card numbers, account numbers, etc.) can serve as bait information that is likely to be used by an attacker. As another example, the system for configuring and deploying decoy content over a network can add metadata to the content than is similar to metadata for content transmitted over the user's network. In some embodiments, at least a portion of the information that the system for configuring and deploying decoy content over a network adds to the decoy content can be used to identify the decoy content from which the information originated. For example, login credentials can include a string of characters that can be used to determine that the login credentials were included in a particular item of decoy content. In a more particular example, identifying information of the string of characters (e.g., the string of characters themselves, a signature based on the string, such as a hash value, etc.) can be stored in a database in connection with other information, such as identifying information of the decoy content in which it was included, identifying information associated with the user, identifying information of a communication channel over which the content was sent, etc.

In some embodiments, the system for configuring and deploying decoy content over a network can cause the configured decoy content to be sent over at least a portion of the user's network. For example, the system for configuring and deploying decoy content over a network can send decoy information over a wide area network (e.g., the Internet) to a destination on the user's network. As another example, the system for configuring and deploying decoy content over a network can instruct one computing device in the user's network (e.g., a virtual machine instance, a host with a decoy content agent installed, etc.) to a destination inside or outside the user's network.

In some embodiments, the system for configuring and deploying decoy content over a network can periodically (e.g., at regular and/or irregular intervals) determine whether the profile of the content being transmitted over the user's network has changed. For example, the system for configuring and deploying decoy content over a network can re-scan the network traffic. As another example, the system for configuring and deploying decoy content over a network can determine whether a computing device has been added or removed from the user's network (e.g., based on information about the user's network, based on log information, etc.). In some embodiments, the system for configuring and deploying decoy content over a network can determine whether the decoy content being transmitted over at least a portion of the user's network is similar to a new/updated profile of the content being transmitted over the user's network.

FIG. 1A depicts an example of a system 100 for configuring and deploying decoy content over a network in accordance with some embodiments of the disclosed subject matter. As shown in FIG. 1A, in some embodiments, system 100 can include compute resources 102 associated with a particular user (e.g., "user A") of a compute service. In some such embodiments, the user can be a person (e.g., a developer, a website administrator, an application administrator, etc.) and/or an entity (e.g., a corporation, a non-profit organization, etc.). Additionally, in some embodiments, compute resources 102 can act programmatically to perform one or more actions. Although shown and described as resources provided through a compute service, compute resources 102 can be any suitable computing device or combination of computing devices. For example, compute resources 102 can include physical computing devices associated with a user that are not provided through the compute service (e.g., a personal computer, a laptop computer, a server, a smartphone, a tablet computer, a wearable computer, etc.), and virtual computing devices provided through a different platform (e.g., a different compute service). Additionally, in some embodiments, actions described herein as being performed by compute resources 102 can be performed by one or more virtual machines that are provided within compute resources 102 by a compute service in connection with compute resources 102, one or more physical computing devices associated with the compute service (e.g., infrastructure for providing the compute service), one or more other computing devices authorized to act on behalf of the user associated with compute resources 102 (e.g., based on credentials, a certificate, etc.).

In some embodiments, compute resources 102 can include a be part of a network 104 which can include one or more physical networks (e.g., which can be owned and/or operated by the user associated with compute resources 102) and/or one or more virtual networks (e.g., which can be provided by physical computing devices made available by a service provider) including compute resources made available to the user through a compute service. For example, network 104 can include any suitable number of virtual machines that can be arranged in a network for performing one or more actions (e.g., providing access to web pages, applications, services, a database, etc.). As another example, network 104 can include compute resources that are available to the user as a service, such as an electronic data storage service, a network-accessible services system that can perform one or more on-demand functions, a load balancing services, database management services, etc. In some embodiments, network 104 can include compute resources provided by a single physical computing device, by a single data center, by a group of interconnected data centers (e.g., connected by low latency communication links), by groups of interconnected data centers that are not directly connected to other groups of data centers (but that may be connected via a wide area network, such as the Internet). Additionally, in some embodiments, network 104 can be organized into different subnets, some of which may be physically and/or logically isolated from one another.

In some embodiments, compute resources 102 can interact with a decoy content configuration and deployment service (sometimes referred to herein as a "decoy content service") that is provided, at least in part, by a computing environment 106 to transmit decoy content over at least a portion of network 104 that is configured to resemble content transmitted over at least apportion of network 104. In some embodiments, compute resources 102 can interact with a frontend 110 using a communication network 108 to submit requests and/or instructions to the decoy content service. For example, compute resources 102 can submit a request to begin setting up the decoy content service for at least a portion of network 104. As another example, compute resources 102 can submit a request to the decoy content service to perform a scan of content transmitted over at least a portion of network 104 to build a profile of network traffic over at least that portion of network 104. As yet another example, compute resources 102 can submit instructions to the decoy content service indicating which portion(s) of network 104 is to be scanned, portion(s) of network 104 and/or subnet(s) over which the decoy content service is to transmit decoy content, etc.

In some embodiments, communication network 108 can be any suitable wired network, wireless network, any other suitable network, or any suitable combination thereof. Additionally, communication network 108 can be any suitable personal area network, local area network, wide area network, over-the-air broadcast network (e.g., for radio or television), cable network, satellite network, cellular telephone network, any other suitable type of network, or any suitable combination thereof. For example, communication network 108 can include a publicly accessible network of linked networks, in some cases operated by various distinct parties, such as the Internet. In some embodiments, communication network 108 can include a private or semi-private network, such as a corporate or university intranet. Additionally, in some embodiments, communication network 108 can include one or more wireless networks, such as a Global System for Mobile Communications ("GSM") network, a Code Division Multiple Access ("CDMA") network, a Long Term Evolution ("LTE") network, any other suitable wireless network, or any suitable combination of wireless networks. Communication network 108 can use any suitable protocols and/or components for communicating via the Internet and/or any of the other aforementioned types of networks. For example, communication network 108 can use one or more protocols or combinations or protocols, such as Hypertext Transfer Protocol ("HTTP"), HTTPS, Message Queue Telemetry Transport ("MQTT"), Constrained Application Protocol ("CoAP"), etc.

In some embodiments, among other things, frontend 110 can provide a user interface (e.g., a webpage, an application, etc.) that can be presented to a user of compute resources 102, and the user can manually select and/or provide information that can be used to build a profile of content sent over one or more portions of network 104. Additionally or alternatively, a user of compute resources 102 can authorize the decoy content service to scan traffic sent over one or more portions of network 104 (and/or request information from a system and/or service providing compute resources 104 about traffic sent over at least a portion of network 104) to gather information that can be used to build a profile of traffic sent over the one or more portions of network 104. In some embodiments, the decoy content service can use a network traffic scanning system 112 to perform a scan of at least a portion of network 104 and/or to request information from a provider of compute resources 102. For example, network traffic scanning system 112 can, with permission explicitly granted by the user, send one or more messages to a logging service (e.g., as described below in connection with network log information 132) requesting information about network traffic sent over at least a portion of network 104.

As another example, network traffic scanning system 112 can submit requests for information about virtual network to an API made available by a provider of compute resources 102. In such an example, the API can implement API calls for gathering information about resources deployed in network 104. In a more particular example, network 104 can include one or more virtual machines provided through a compute resources virtualization platform, and an API made available in connection with the compute resources virtualization platform can support API calls that allow a computing device with the proper permissions (e.g., credentials, security certificate, encryption key, etc.), to request information about virtual machines associated with a particular user and/or a particular virtual network. In such an example, network traffic scanning system 112 can use the information about virtual machines in network 104 to request information (e.g., from a logging service) about communications to and/or from those virtual machines.

As yet another example, network traffic scanning system 112 can install and/or launch one or more applications (and/or virtual machines) within network 104 that can gather information about traffic sent over at least a portion of network 104. Additionally or alternatively, network traffic scanning system 112 can instruct a user to install and/or launch one or more applications (and/or virtual machines) within network 104. In some embodiments, such applications and/or virtual machines can gather information and send it to a destination specified by network traffic scanning system 112 (e.g., an electronic data store, a database, an API, etc.). As described below in connection with FIG. 2, network scanning system 112 can use any suitable technique or combination of techniques to gather information about traffic over at least a portion of network 104. Note that, in some embodiments, a user of compute resources 102 can authorize network traffic scanning system 112 (and/or any other suitable portion of the honeypot configuration service) to submit API calls to an API provided by the provider of compute resources 102 (and/or any other suitable mechanism made available by the provider to gather information about network 104 and/or traffic over at least a portion of network 104). For example, compute resources 102 can provide credentials or other information that can be used to convey authorization (e.g., a security certificate, an encryption key, etc.) to the decoy content service (e.g., through frontend 110) that can be used to gather information from the provider of compute resources 102. As another example, compute resources 102 can provide identifying information associated with network traffic scanning system 112 (and/or any other portion of the decoy content service) to the provider of compute resources 102 authorizing network scanning system 112 to gather information about network 104.

In some embodiments, information about traffic on network 104 can be network activity metadata 114 which can include any suitable information about traffic on network 104, and can be received from any suitable source (e.g., a virtual machine within network 104, an API associated with the provider of compute resources 102, a computing device, such as a web server, associated with the provider of compute resources 102). For example, network activity metadata 114 can include information about computing devices (e.g., virtual machines) that are deployed within network 104. As another example, network activity metadata 114 can include information about services being used in connection with network 104. As yet another example, network activity metadata 114 can include information about network interfaces used by computing devices in network 104 and/or identifying information associated with the network interfaces (e.g., IP address information). As still another example, network activity metadata 114 can include information about traffic sent to, and/or received by, a particular virtual machine in network 104, a particular service used in connection with network 104, etc. In some embodiments, network activity metadata 114 can be communicated to network traffic scanning system 112 (e.g., from compute resources 102, from the provider of compute resources 102, etc.) via communication network 108 via frontend 110.

In some embodiments, frontend 110 can receive and process messages from compute resources 102 and/or any other suitable computing device. For example, in some embodiments, frontend 110 can serve as a "front door" to the honeypot configuration service (as well as any other systems and/or services provided in connection with the honeypot configuration service), such as network traffic scanning system 112, a decoy content configuration system 120, and/or a decoy content placement system 126. Frontend 110 can process messages received from compute resources 102 and/or generated, for example, in response to events (e.g., when compute resources 102 enters information into a user interface provided via frontend 110), and can determine whether the messages are properly authorized. For example, frontend 110 can determine whether a user and/or computing device associated with the message is authorized to request that changes be made to compute resources 102, and/or is authorized to grant permissions to others (e.g., network traffic scanning system 112, decoy content placement system 126, etc.) to request information about at least a portion of compute resources 102 and/or to make changes to at least a portion of compute resources 102 (e.g., changes to a portion of network 104). In some embodiments, frontend 110 can include one or more APIs that can receive messages as API calls (e.g., from compute resources 102 and/or any other suitable computing device). As such, in some embodiments, frontend 110 can effectuate one or more APIs for interacting with the decoy content service (and/or any portions thereof), such as one or more APIs for authorizing the service provider to deploy one or more applications and/or virtual machines to network 104, providing information about the configuration of network 104, configuring decoy content to send over a portion of network 104 and/or details of the decoy content, etc.

In some embodiments, frontend 110 can provide network activity metadata 114 to network traffic scanning system 112, which can generate profile information 116 about traffic sent over at least a portion of network 104 based on network activity metadata 114. For example, network traffic scanning system 112 can determine what type(s) of virtual machine instances are deployed in network 104 (e.g., an OS, a version of the OS, programming languages, etc.). As another example, network traffic scanning system 112 can determine what types of services are being used by network 104 (e.g., a compute resources virtualization platform, a load balancing service, a virtual network communication logging service, etc.). As yet another example, network traffic scanning system 112 can determine one or more protocols used to send content over at least a portion of network 104. As still another example, network traffic scanning system 112 can determine information about security rules used in connection with virtual machines in network 104, subnets within network 104, network interfaces attached to virtual machines within network 104, and/or network 104 itself.

In some embodiments, network traffic scanning system 112 can receive information selected and/or otherwise entered into a user interface (e.g., a graphical user interface or command line interface presented via frontend 110) indicating which portion or portions of network 104 are to be monitored using decoy content. For example, the user can select one or more computing devices or groups of computing devices in network 104 (e.g., one or more virtual machine instances) to be monitored using decoy content. Additionally, in some embodiments, network traffic scanning system 112 can receive information selected and/or otherwise entered into a user interface (e.g., a graphical user interface or command line interface presented via frontend 110) indicating (and/or confirming) one or more protocols used by various different computing devices. For example, in some embodiments, network traffic scanning system 112 can determine one or more communication protocols that are being used based on information received from compute resources 102. As another example, network traffic scanning system 112 can determine one or more communication protocols that are being used based on information received from one or more agents installed on computing devices in network 104. As yet another example, network traffic scanning system 112 can determine one or more communication protocols that are being used based on information received from an API associated with compute resources 102. As still another example, network traffic scanning system 112 can determine one or more communication protocols that are being used based on information received from log information (e.g., provided through a logging service). In some such examples, network traffic scanning system 112 can present information indicating which communication protocols network traffic scanning system 112 has determined are being used over various communication channels in network 104, and prompt a user to provide feedback about the accuracy of the determinations.

In some embodiments, network traffic scanning system 112 can receive source code associated with one or more computing devices in network 104, and can infer the types of content that are sent based on the source code. For example, network traffic scanning system 112 can use function names, configuration files, binaries, etc., to infer the types of content that are sent from and/or received by a particular computing device.

In some embodiments, network traffic scanning system 112 can receive information selected and/or otherwise entered into a user interface (e.g., a graphical user interface or command line interface presented via frontend 110) indicating how a user wishes to be notified that information included in decoy content sent over network 104 has been detected (e.g., indicating that the decoy content was intercepted in transit, or otherwise obtained). For example, network traffic scanning system 112 can receive information indicating that the user wishes to receive alerts via push notifications sent to an application associated with the user's account with the service provider. As another example, network traffic scanning system 112 can receive information indicating that the user wishes to receive alerts via email, text message, etc. As yet another example, network traffic scanning system 112 can receive information can receive information indicating that the user wishes to receive alerts by logging in to the user's account with the decoy content system. As still another example, network traffic scanning system 112 can receive information can receive information indicating that the user wishes to receive no alerts.

In some embodiments, network traffic scanning system 112 can receive information selected and/or otherwise entered into a user interface (e.g., a graphical user interface or command line interface presented via frontend 110) indicating parameters regarding what types of communications (or combinations of types of communications) decoy content system can transmit over network 104. For example, network traffic scanning system 112 can receive information indicating that communications from a source external to network 104 to a destination within virtual network are permitted, which is sometimes referred to herein as inbound traffic. As another example, network traffic scanning system 112 can receive information indicating that communications from a computing device within network 104 to an external destination are permitted, which is sometimes referred to herein as outbound traffic. As yet another example, network traffic scanning system 112 can receive information indicating that communications from a computing device within network 104 to another computing device within network 104 are permitted, which is sometimes referred to herein as internal traffic.

In some embodiments, network traffic scanning system 112 can receive information selected and/or otherwise entered into a user interface (e.g., a graphical user interface or command line interface presented via frontend 110) indicating parameters regarding how much traffic the decoy content service is permitted to transmit over network 104. Additionally, in some embodiments, network traffic scanning system 112 can receive information selected and/or otherwise entered into a user interface (e.g., a graphical user interface or command line interface presented via frontend 110) indicating parameters regarding a maximum number of connections can be created by decoy content service, parameters indicating which portion(s) of network 104 are more important (which can be used, for example, by the decoy content service to determine where to allocate resource), parameters indicating a maximum number of virtual machine instances the decoy content service can launch in network 104, etc. Note that, although user input was generally described as being submitted through a user interface, this is merely an example, and user input can be received using any suitable technique or combination of techniques, such as through an API (e.g., provided by frontend 110), by submitting a document indicating the user input to a location (e.g., an electronic data store, a database, etc.) accessible by the decoy content system, etc.

In some embodiments, network traffic scanning system 112 can create and/or update one or more entries in a network profile database 118. Although described as a database, in some embodiments, network profile database 118 can be any suitable data structure. For example, network profile database 118 can be a relational database or a non-relational database. As another example, network profile database 118 can be an electronic data store having a file system in which profile information (e.g., profile information 116) for various users' virtual networks are stored (e.g., as documents).

In some embodiments, network traffic scanning system 112 can periodically (e.g., at regular and/or irregular intervals) analyze (e.g., scan) network 104 (and/or cause network 104 to be scanned). For example, network traffic scanning system 112 can re-scan at least a portion of network 104 if a scan has not been performed within a particular period of time (e.g., within the last day, week, month, etc.). As another example, network traffic scanning system 112 can re-scan at least a portion of network 104 when network traffic scanning system 112 determines that there was likely a change to the configuration of network 104. In a more particular example, network traffic scanning system 112 can (with explicit permission from the user) monitor log information related to changes to at least a portion of network 104 (e.g., submitted via an API associated with a provider of the compute service providing at least a virtual network portion of network 104) such as deployment of software applications to one or more virtual machine instances, changes to add and/or remove virtual machine instances from network 104, etc.

As yet another example, network traffic scanning system 112 can receive information (e.g., via frontend 110) indicating that the configuration of network 104 changes on a relatively regular schedule (e.g., based on a period computational task performed by the user, based on external events that drive traffic to network 104 at particular times, etc.). In such an example, network traffic scanning system 112 can re-scan at least a portion of network 104 when the user has indicated that the network configuration is likely to be different.

In some embodiments, network traffic scanning system 112 (and/or any other suitable system) can evaluate content stored in connection with network 104 (e.g., that is accessible through one or more virtual machine instances in network 104). For example, in some embodiments, a user associated with compute resources 102 can grant permission to network traffic scanning system 112 to access one or more electronic data stores associated with compute resources 102. In such an example, network traffic scanning system 112 can access the electronic data store to gather information about the user's content, such as organization (e.g., organization of the file system), naming conventions, the amount of content that the virtual machine instance has access to, etc. As another example, a user associated with compute resources 102 can grant permission to network traffic scanning system 112 to take a snapshot of the user's content that is stored using a storage service (e.g., that is provided by the same service provider that provides the compute service). As yet another example, a user associated with compute resources 102 can supply (and/or grant access to) a sample of content stored in connection with one or more portions of network 104.

In some embodiments, network traffic scanning system 112 can use any suitable technique or combination of techniques to determine how the user's content is organized and/or formatted. For example, network traffic scanning system 112 can use one or more natural language processing techniques to identify naming conventions used to identify the user's content. As another example, network traffic scanning system 112 can use one or more natural language processing techniques to identify the types of information included in the user's content (e.g., phone numbers, email addresses, social security numbers, names, credit card numbers, account numbers, etc.). In some embodiments, information about the user's content (e.g., a file system, information about a naming convention, information on the format of content, etc.), can be incorporated into profile information 116 and/or otherwise stored in network profile database 118 in connection with the user.

In some embodiments, decoy content configuration system 120 can use at least a portion of profile information for a virtual network (e.g., profile information 116 generated by network traffic scanning system 112) to identify content that may be suitable for transmission using one or more communication channels in network 104. For example, decoy content configuration system 120 can access at least a portion of profile information (e.g., profile information 116) about network 104 from network profile database 118, and can use the information to identify potentially suitable content. As another example, decoy content configuration system 120 can receive profile information from network traffic scanning system 112. As yet another example, decoy content configuration system 120 can receive profile information from compute resources 102 (and/or any other suitable computing device associated with a user of compute resources 102) submitted via frontend 110 (e.g., using an API, using a graphical user interface provided via a webpage or application, etc.).

In some embodiments, decoy content configuration system 120 can use any suitable technique or combination of techniques to identify potentially suitable decoy content. For example, in some embodiments, decoy content configuration system 120 can retrieve information from a repository of available decoy content template configurations 122 using the profile information. In such an example, decoy content repository 122 can include information about preconfigured decoy content templates that can be used to provide decoy content customized for network 104. Additionally, in such an example, decoy content configuration system 120 can use properties of content sent over one or more communication channels in network 104 to query a database for decoy content template configurations that are similar to the content sent over one or more communication channels in network 104. In a more particular example, if the content sent over network 104 includes personally identifying information (e.g., login credentials, names, birthdates, social security numbers, account numbers, etc.), decoy content configuration system 120 can query decoy content repository 122 for preconfigured decoy content templates that include similar types of personally identifying information.

As another more particular example, if the content sent over network 104 includes documents (e.g., web pages, xml documents, spreadsheets, etc.), decoy content configuration system 120 can query decoy content repository 122 for decoy content templates formatted as similar types of documents. As yet another more particular example, if the content sent over network 104 includes content related to a particular type of industry (e.g., financial information, health information, order information, security information, etc.), decoy content configuration system 120 can query decoy content repository 122 for decoy content templates formatted as content from a similar type of industry. As still another more particular example, decoy content configuration system 120 can query decoy content repository 122 based on the language of the user's content (and/or user's account, political location of compute resources, etc.).

In some embodiments, decoy content configuration system 120 can determine which content identified from decoy content repository 122 is sufficiently similar to the content transmitted over one or more communication channels in network 104. In some embodiments, decoy content configuration system 120 can identify any decoy content that matches particular properties (e.g., type of content, industry, format, etc.) as being sufficiently similar. Additionally or alternatively, decoy content configuration system 120 can use machine learning techniques to determine which decoy content is sufficiently similar to the content associated with the user. For example, decoy content configuration system 120 can use a recurrent neural network to identify properties of the user's content that match content in decoy content repository 122.

In some embodiments, decoy content configuration system 120 can identify a corpus of decoy content from decoy content repository 122 that is sufficiently similar to the user's content transmitted over a particular communication channel, and can select particular items of content to be deployed using a random or pseudo-random process to select form the corpus. Selecting the content to be deployed from a relatively large set can confound malicious users that may attempt to gain insight into the honeypot content by subscribing to the decoy content service in an attempt to develop countermeasures to relatively quickly identify the decoy content deployed by the decoy content service.

In some embodiments, decoy content configuration system 120 can identify appropriate content for each communication channel independently. For example, decoy content configuration system 120 can use profile information for a first communication channel (e.g., between a web server in network 104 and the Internet) to select first decoy content for transmission over a similar communication channel in network 104, and can use profile information for a second communication channel (e.g., between the web server in network 104 and a database service) to select second decoy content for transmission over a similar communication channel in network 104.

In some embodiments, decoy content repository 122 can include multiple different decoy content repositories that can be independently accessed. For example, decoy content repository 122 can include a group of various databases each maintained by a separate database management system. As another example, decoy content repository 122 can include a single database maintained by a single database management system with one or more indices that each represent a different category of subject matter, a different type of content (e.g., documents, data structures, requests, queries, etc.), etc.

In some embodiments, decoy content configuration system 120 can associate decoy content identified from decoy content repository 122 with a particular communication channel (or communication channels) in network 104 and/or with particular communication channel (or communication channels) created by the decoy content service in connection with network 104. Additionally, in some embodiments, decoy content configuration system 120 can associate decoy content identified from decoy content repository 122 with a particular communication protocol (or protocols) to be used to transmit the content.

In some embodiments, decoy content configuration system 120 can determine security rules to be used for transmission of decoy content over a particular communication channel. For example, decoy content configuration system 120 can determine which security rules are used when transmitting content over a similar communication channel in network 104 (e.g., based on profile information 116). In such an example, decoy content configuration system 120 can configure security rules for transmission of the decoy content to be less stringent than the security rules being used in network 104. In a more particular example, if communications over a particular communication channel in network 104 use HTTPS, decoy content configuration system 120 can configure security rules for use with transmission of decoy content over a corresponding communication channel to be less secure than the security rules used in connection with HTTPS over the communication channel in network 104, such as by using HTTP when sending decoy content, or using a cipher suite that does not include encryption (or includes encryption that is known to be compromised or that uses a relatively short encryption key). As another more particular example, decoy content configuration system 120 can configure security rules for use with transmission of decoy content to omit proper certificate validation.

In some embodiments, decoy content configuration system 120 can prompt a user to provide feedback regarding the decoy content selected by decoy content configuration system 120. For example, decoy content configuration system 120 can prompt a user to provide feedback regarding whether the selected decoy content is sufficiently similar to the content being sent over the user's network 104. As another example, decoy content configuration system 120 can prompt a user to provide feedback about protocols used to transmit content on communication channels in network 104. In a more particular example, the user can provide feedback indicating that one or more communication protocols are not correctly represented by configuration system 120. As another more particular example, the user can provide feedback correcting one or more properties of a communication protocol used in network 104. As yet another example, decoy content configuration system 120 can prompt a user to provide feedback about how the user wishes security to be compromised on one or more communication channels to be used to transmit decoy content.

Additionally, in some embodiments, a user can be prompted to identify a level of security to apply to transmission of the decoy content. For example, in some embodiments, the user can be prompted to select what type of attacker they want to be able to access the decoy content (e.g., a bot, a typical attacker, a sophisticated attacker, a state sponsored attacker, etc.), and security rules can be tailored to the type of attacker (e.g., by modifying the security rules used when transmitting the decoy content). As another example, the user can be prompted to select a level of difficulty, indicating the amount of effort and/or sophistication required to compromise the decoy content in transit.

In some embodiments, decoy content configuration system 120 can receive decoy content (e.g., via frontend 110) from a user associated with network 104. In some such embodiments, decoy content configuration system 120 can incorporate the decoy content received from the user into content to be transmitted over the one or more communication channels in network 104.

In some embodiments, decoy content configuration system 120 can insert details and/or bait information into the selected and/or received decoy information, such as login credentials, names, dates, social security numbers, credit card numbers, gift card numbers, account numbers, amounts, etc. In some embodiments, decoy content configuration system 120 can generate signatures of the bait information that can be used to identify the bait information (e.g., when it is received). For example, decoy content configuration system 120 can use a hash function to generate a signature of a particular item. As another example, decoy content configuration system 120 can perform a series of mathematical operations to identify a unique characteristic or characteristics of the item that can be used to positively identify the item. In some embodiments, decoy content configuration system 120 can add one or more tags into the bait information that have been inserted into the decoy information. For example, decoy content configuration system 120 can add a string of characters to an item that can be used to identify the item. In some embodiments, decoy content configuration system 120 can interact with one or more systems to generate and/or register bait information. For example, decoy content configuration system 120 can interact with a gift card system to generate and/or register gift card numbers that are to be used as bait information such that the gift card system (e.g., in connection with an authentication system as described below in connection with FIG. 1B) will recognize the bait information as being a valid gift card, and can record the activity associated with the bait information. As another example, decoy content configuration system 120 can register credentials generated as bait information with an authentication system in connection with a user associated with compute resources 102. In such an example, the credentials can be given no permissions to affect any changes to, or gather any information about, the user's production computing environment.

In some embodiments, at least a portion of the details added to the decoy content can be generated from publicly available information, such as a list of usernames and/or passwords that have already been compromised, a list of names that is publicly available (e.g., from a telephone directory), etc. In some embodiments, such publicly available information can be combined with other information that is not publicly available (and that may not be easily verifiable as being associated with the public information) to make the decoy content more realistic and/or more enticing. For example, the publicly available information can be combined with an indication that account information that includes a username and a proper name subscribes to a particular service (e.g., a subscription that includes free shipping on certain items purchased from an online retailer), a credit card number, etc.

In some embodiments, decoy content configuration system 120 can use profile information 116 to determine a network configuration to set up in network 104 to create one or more communication channels that can be used to transmit the decoy content. For example, as described below in connection with FIG. 3, a particular virtual network may include a group of instances used to provide a web application to end users. Such a configuration can include a cluster of virtual machine instances acting as web servers, which connect with a cluster of virtual machine instances acting as application servers that provide access to an application. In such an example, decoy content configuration system 120 can determine a network configuration for honeypots (and/or decoy content agents) that can be incorporated into the virtual network to provide communication channels over which decoy content can be transmitted.

In some embodiments, decoy content configuration system 120 can select parameters for network interfaces (e.g., virtual network interfaces) to use in connection with various communication channels, based on properties of network interfaces used by corresponding virtual machine instances in network 104 that were involved in transmitting the traffic analyzed by network traffic scanning system 112. For example, decoy content configuration system 120 can select a subnet to which a network interface is to be attached, a number of network interfaces to assign to the honeypot (and/or decoy content agent), security rules to be associated with each network interface, etc.

In some embodiments, compute resources 102 can be configured to respond to certain queries from decoy content configuration system 120 without user intervention. For example, the user can configure an API (e.g., through a graphical user interface, through a command line interface, through a script, etc.) to respond to particular API calls from decoy content configuration system 120. In such an example, decoy content configuration system 120 can configure decoy content and/or communication channels for deployment without user intervention (e.g., when changes to network 104 have been detected by network traffic scanning system 112). In some embodiments, the API associated with network 104 can be implemented using a network-accessible services system that can be configured to perform one or more on-demand functions that respond to calls from decoy content configuration system 120.

In some embodiments, decoy content configuration system 120 can provide configured decoy content information 124 to content placement system 126, which can prepare instructions 128 to deploy one or more virtual machine instances, decoy content agents, and/or decoy content specified by configured decoy content information 124. In some embodiments, content placement system 126 can deploy virtual machine instances, decoy content agents, and/or decoy content specified by configured decoy content information 124 by, for example, calling an API made available by the service provider through which compute resources 102 are provided. For example, content placement system 126 can call the API for each virtual machine instance to be deployed with information identifying a virtual machine image and/or one or more software images that are to be used to deploy that particular virtual machine instance. In such an example, the API call to deploy the virtual machine instance can be similar (or identical) to an API call that the user associated with compute resources 102 can make to deploy a virtual machine instance in network 104. In some embodiments, content placement system 126 can specify a location at which the virtual machine instance is to be deployed (e.g., a region, availability zone, subnet, etc.). Additionally, in some embodiments, content placement system 126 can make API calls to create and/or attach one or more network interfaces (e.g., virtual network interfaces) to the virtual machine instance. Such network interfaces can be associated with security rules that restrict communications to and/or from the virtual machine instance through the network interface. Similarly, in some embodiments, content placement system 126 can use similar techniques to cause one or more decoy content agents to be installed by one or more computing devices in network 104 (e.g., a virtual machine instance, a server, etc.).

In some embodiments, after being deployed in network 104, the virtual machine instances and/or decoy content agents deployed by content placement system can execute software that can receive and/or retrieve decoy content, and transmit the decoy content in accordance with decoy content deployment instructions 128. For example, virtual machine instances and/or decoy content agents can request and/or receive decoy content to be sent over a communication channel, and can format and send the decoy content in a communication protocol specified by content deployment instructions 128. In some embodiments, the decoy content can be stored in an electronic data store attached to the virtual machine instance and/or the computing device on which the decoy content agent is installed. In such embodiments, the virtual machine instances and/or decoy content agents can retrieve decoy content from the electronic data store to transmit over the communication channel. Additionally or alternatively, in some embodiments, the decoy content can be sent to the virtual machine instance and/or the computing device on which the decoy content agent is installed for transmission over the network 104. In some embodiments, the decoy content that is sent can include any suitable type of content, such as files, documents, media, etc. Additionally or alternatively, in some embodiments, the decoy content that is sent can include information that would be exchanged when a user accesses virtual network, such as login credentials as they would be submitted to an authentication system, a token or other credential returned from the authentication system, etc., that may be involved in establishing a session.

In some embodiments, one or more of the computing device that are deployed to transmit decoy content can be configured to monitor communications by the computing device transmitting the decoy content. For example, the computing device can be configured to log particular information about its network activity, such as identifying information of content that was sent and/or received, a source and/or destination of the content (e.g., an IP address), a time when the content was sent and/or received, etc. In some embodiments, software for monitoring communications can be deployed to execute on the computing device (e.g., virtual machine instance) sending and/or received the decoy content. As another example, the software for monitoring communications can be deployed as software that is executed outside a virtual machine instance sending and/or receiving the decoy content. In a more particular example, the software for monitoring communications can be executed using a first set of containers on a virtual machine instance, and the functions for sending and/or receiving decoy content can be provided by another set of containers on the virtual machine instance that are isolated from the first set of containers. As yet another example, the software for monitoring communications can be deployed outside of the virtual machine instance being used to send and/or receive the decoy content (e.g., the software for monitoring communications can be deployed on another virtual machine instance that is connected to the virtual machine instance sending and/or receiving the decoy content, and can intercept communications to and from the first virtual machine instance). In some embodiments, the software for monitoring communications can monitor communications activity using any suitable technique or combination of techniques. For example, the software for monitoring communications can implement a network tap to capture and relay traffic to and/from the computing device. In some embodiments, the software for monitoring communications can be software that is associated with virtual machine instances in network 104 for reporting activity and/or the state of the virtual machines. For example, such event logging software can be deployed as part of the compute service providing access to compute resources 102. In a more particular example, software for monitoring communications can be software made available by the compute service to generate log information that can be used by a user associated with compute resources 102 to monitor and/or analyze operation of network 104.

In some embodiments, the software for monitoring communications can send network log information 130 to a network log information database 132. In some embodiments, when an item of decoy content is detected (e.g., as described below in connection with FIG. 1B), information in network log information database 132 can be retrieved to determine which communication channel and/or computing device was used to send and/or receive the decoy content. In some embodiments, the network logs can be accessed with or without the intervention of a user. However, in some embodiments, access to network log information can be restricted to one or more users or systems that are considered more trustworthy and/or more difficult to compromise. For example, an account designated as the owner of resources in network 104 can be prohibited from accessing information from network log information database 132, as that account may be relatively more likely to be compromised during a breach of network 104. In such an example, access to network log information database 132 can be restricted to a parent account of the resource owner account, which may have more stringent security requirements than the resource owner account. For example, the parent account may require two-factor authentication (or a higher ordered multi-factor authentication) at each login, may log out the user after a period of inactivity, etc. This can reduce the likelihood that an attacker can gain access to network log information, which may allow the attacker to easily identify (and ignore) decoy content transmissions sent over network 104.

In some embodiments, content placement system 126 can store information identifying decoy content that is to be transmitted over network 104, information identifying which communication channel is to be used to transmit the decoy content over network 104, and/or information identifying the user associated with network 104, to a deployed decoy content information database 136. For example, in connection with content placement system 126 causing decoy content to be transmitted over network 104, content placement system 126 can store identifying information about the decoy content in deployed decoy content information database 136, such as a signature of at least a portion of the decoy content or other information that can be used to uniquely identify the decoy content, identifying information of a decoy content template used to create the deployed decoy content, a communication channel over which the decoy content was to be sent, etc.

Figure 1B:
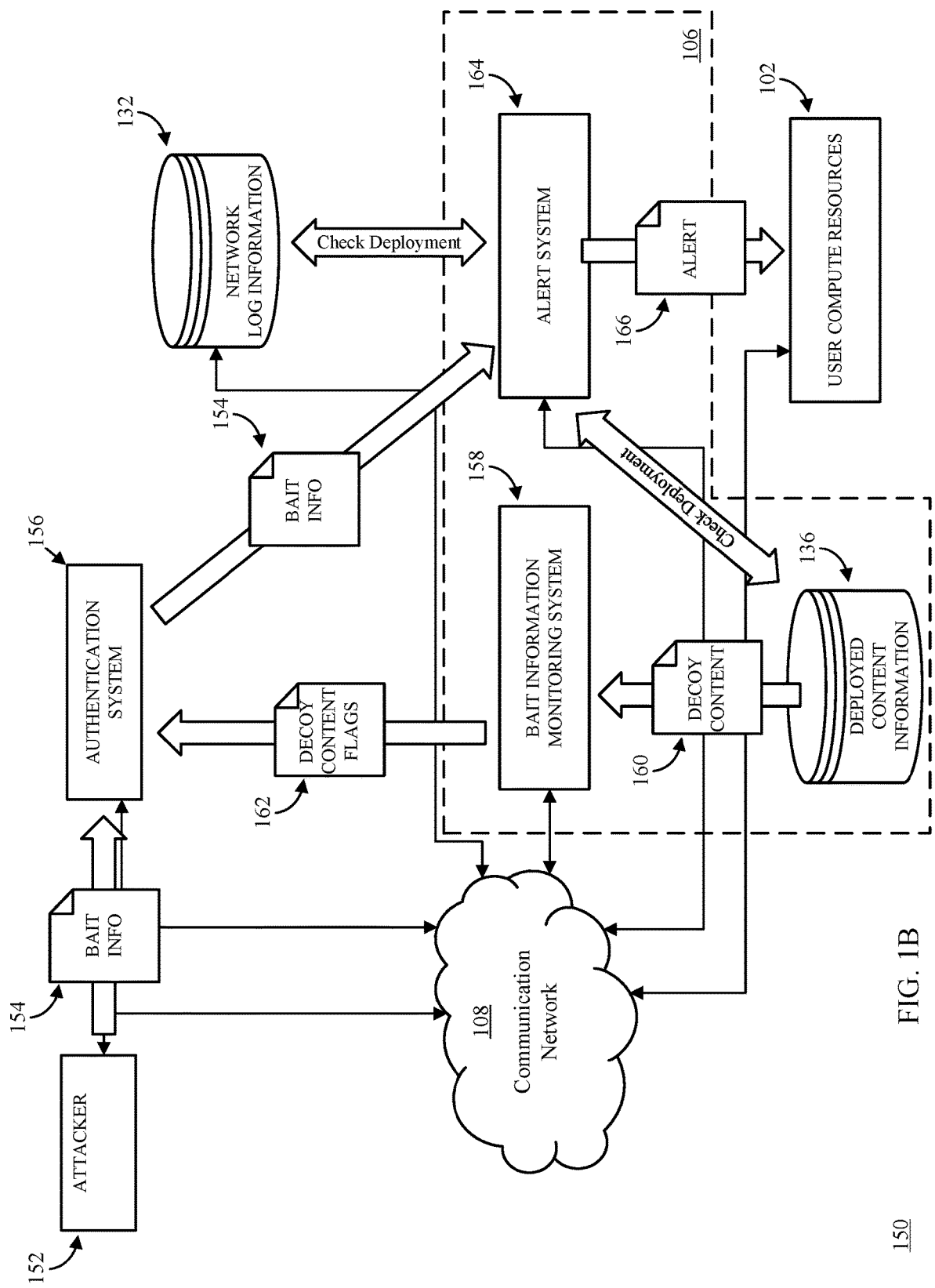
FIG. 1B is a diagram of an example system for monitoring for the use of decoy content that was transmitted over a network in accordance with some embodiments of the disclosed subject matter.

FIG. 1B depicts an example of a system 150 for monitoring for the use of decoy content that was transmitted over a network in accordance with some embodiments of the disclosed subject matter. As shown in FIG. 1B, in some embodiments, system 150 can include an attacker 152 that intercepted communications over at least a portion of network 104. In some embodiments, attacker 152 can submit bait information 154 that was extracted from the decoy content to an authentication system in an attempt to use the extracted bait information. In some embodiments, bait information 154 can include any suitable information that an attacker may submit to an authentication system, such as login credentials, social security numbers, credit card numbers, gift card numbers, account numbers, etc.

In some embodiments, authentication system 156 can be any suitable authentication system that is included in any suitable computing system. For example, in some embodiments, authentication system 156 can be accessed to log in to an account on one or more services. As another example, authentication system 156 can be accessed to verify whether a gift card number or credit card number is valid.

In some embodiments, a bait information monitoring system 158 can retrieve and/or receive decoy content 160 (and/or identifying information for decoy content) that has been (and/or will be) deployed for transmission in connection with one or more user's networks from deployed decoy content information database 136. In some such embodiments, bait information monitoring system 158 can use decoy content to set decoy content flags 162 in authentication system 156. For example, authentication system 156 can use decoy content flags 162 to identify gift card numbers, credit card numbers, login credentials, etc., that have been deployed as part of decoy content. As another example, decoy content flags 162 can be added to a table (or other data structure) used by authentication system 156 to determine whether a submitted item is valid or invalid, but with a flag set indicating that a particular item corresponds to decoy content. In such an example, authentication system 156 can determine that the submitted item is present within a corpus of valid items, and can take an action based on the presence of the flag. Alternatively, when authentication system 156 determines that bait information 154 is invalid (i.e., it does not correspond to a valid item), authentication system 156 can perform a second operation to compare bait information 154 to items indicated by decoy content flags 162. As another alternative, when authentication system 156 determines that bait information 154 is invalid (i.e., it does not correspond to a valid item), authentication system 156 can pass bait information 154 to a second system (e.g., bait information monitoring system 158) to be compared to items flagged in decoy content flags 162. For example, in such a system, bait information monitoring system 158 may not pass decoy content flags 162 to authentication system 156, but can instead check bait information 154 using deployed decoy content information database 136. In some embodiments, bait information monitoring system 158 can be implemented in connection with and/or as part of decoy content placement system 126. In some such embodiments, when decoy content is deployed (e.g., by sending content deployment instructions 128) bait information monitoring system 158/content placement system 126 can share decoy content information 162 with authentication system 156.

In some embodiments, when authentication system 156 (and/or bait information monitoring system 158) determines that bait information 154 corresponding to an item of deployed decoy content has been submitted to authentication system 156, bait information 154 can be passed to an alert system 164. In some embodiments, alert system 164 can identify a communication channel that was used to transmit the item of decoy content that included bait information 154. For example, alert system 164 can access deployed decoy content information database 136 to determine a communication channel over which bait information 154 was transmitted. In such an example, alert system 164 can submit bait information 154 (or information, such as a signature, derived from bait information 154) as a part of a query to deployed decoy content information database 136, which can return information about which decoy content included bait information 154, a communication channel and/or network over which bait information 154 was transmitted, identifying information of a user associated with the communication channel, etc. Additionally or alternatively, in some embodiments, alert system 164 can access network log information 132 for information about when and where the decoy content that included bait information 154 was deployed. For example, if the communication channel is known (e.g., from deployed decoy content information database 136), alert system 164 can use log information from network log information 132 to determine which computing device transmitted the decoy content, where the decoy content was sent, and when the decoy content was sent. As another example, alert system 164 can use log information 132 to search for decoy content that included bait information 154 (which can be determined, for example, by accessing deployed content information 136). In such an example, alert system 164 can search for information associated with the decoy content that is stored in network log information 132.

In some embodiments, when authentication system 156 determines that bait information 154 corresponding to an item of deployed decoy content has been submitted to authentication system 156, authentication system 156 can present a honeypot interface indicating that bait information was authenticated, for example, by presenting a web page purporting to correspond to a user account associated with login credentials included in bait information 154, by presenting a message indicating that a gift card balance was successfully applied to an account based on a gift card number included in bait information 154, by indicating that a purchase was completed based on a credit card number included in bait information 154, etc.

In some embodiments, in addition to, or in lieu of, using authentication system 156 to monitory for the use of identifying information, alert system 164 (and/or any other suitable system) can receive and/or request information from a logging service that records credentials used to submit API calls (and/or any other suitable information associated with the API call, such as IP addresses, identifying information, etc.) to one or more services associated with the compute service that provides compute resources 102 (and/or one or more other service providers and/or systems). For example, the information can be credentials and/or any other suitable security information (e.g., a certificate) that are submitted as an indication that the user submitting the API call is authorized to submit the API call. In some embodiments, bait information monitoring system 158 can provide decoy content flags to such a logging service, which can pass bait information 154 to alert system 164 when matching credentials are received. Additionally or alternatively, in some embodiments, bait information monitoring system 158 can submit a request to the logging service for information about whether particular credentials were submitted and/or for information associated with a particular user (e.g., the user associated with compute services 102), which can be checked for credentials that were inserted into decoy content as bait information. In some such embodiments, the credentials can be nominally associated with the user, but can be denied any permissions to access information related to, and/or make changes to a system configuration of, the user's production environment.

In some embodiments, alert system 164 can cause an alert 166 to be made accessible by a user of compute resources 102 using any suitable technique or combination of techniques. For example, alert system 164 can send alert 166 to the user using one or more techniques, such as by pushing a notification, sending a text message, sending an email, etc. As another example, alert system 164 can associate alert 166 with the user's account, such that when the user logs in to a user interface associated with the account, the user is presented with information about alert 166. As yet another example, alert system 164 can send alert 166 in connection with an API call to an API associated with compute resources 102.

In some embodiments, alert 166 can include any suitable information, such as information about which communication channel was potentially compromised, when the decoy information was sent, etc., which can be used (e.g., by the user associated with compute resources 102) to determine which communication channel was compromised and/or which other communication channels (e.g., among communication channels that were scanned by network traffic scanning system 112) may have also been compromised.

Figure 2:
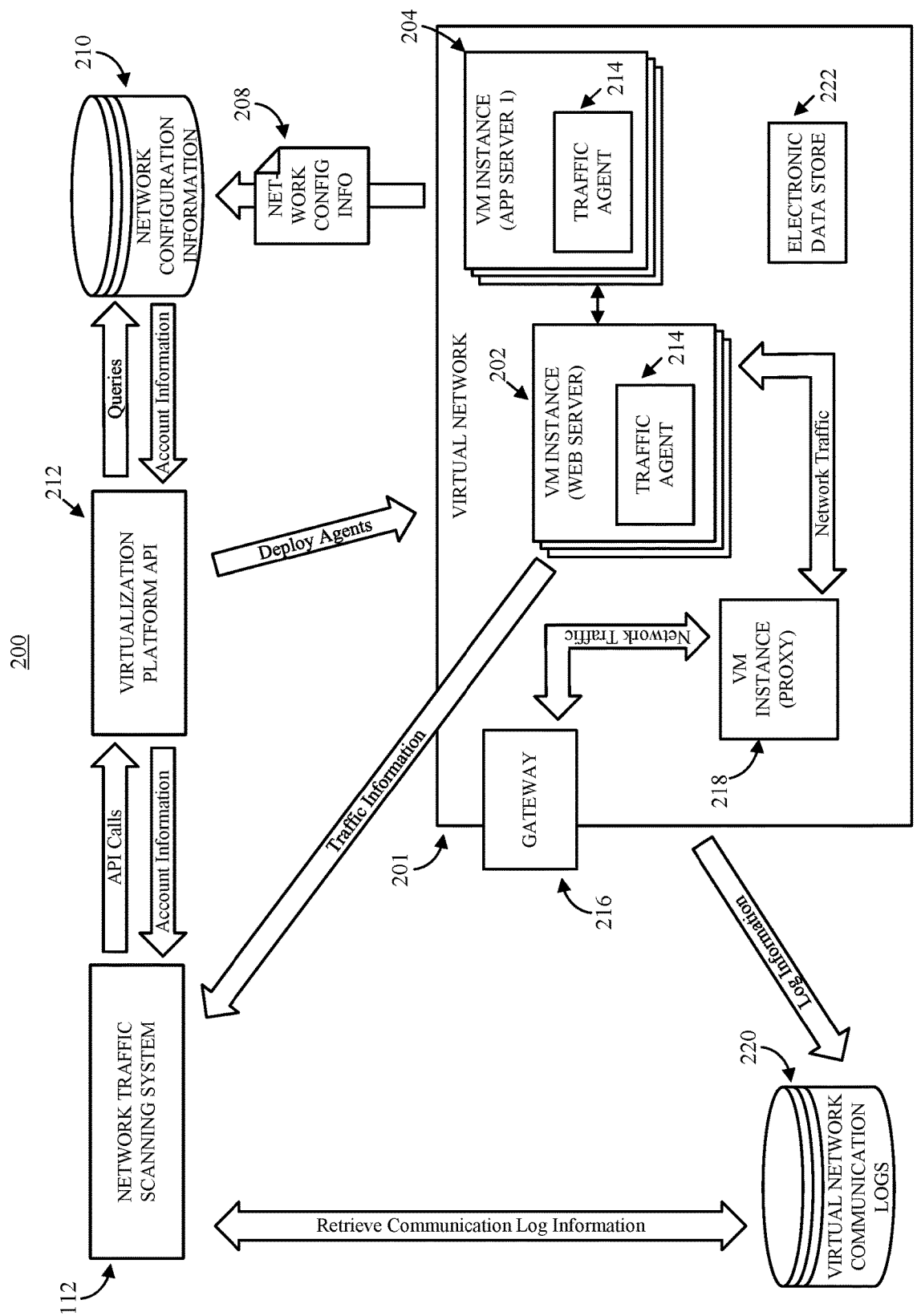
FIG. 2 is a diagram of an example of a system illustrating various techniques that can be used to gather information about network activity on a user's virtual network in accordance with some embodiments of the disclosed subject matter.

FIG. 2 shows an example of a system 200 illustrating various techniques that can be used to gather information about network activity on a user's virtual network in accordance with some embodiments of the disclosed subject matter. As shown in FIG. 2, a virtual network 201 (e.g., provided as part of network 104) can include various virtual machine instances 202, and 204 that can be used to implement various different network services and/or applications. For example, VM instances 202 can be virtual machine instances that are implemented to provide a web server that can interact with client devices over a network (e.g., a public network such as the Internet and/or a private network such as a corporate intranet). As another example, VM instances 204 can be virtual machine instances that are implemented to provide an application accessible by the client devices through the web servers provided by VM instances 202. In some embodiments, as described above in connection with FIG. 1, network traffic scanning system 112 can gather information about the configuration of at least a portion of virtual network 201 represented in FIG. 2. In some embodiments, virtual network 201 and/or a service providing resources to virtual network 201 (e.g., a compute resources virtualization platform providing VM instances 202 and 204) can periodically (at regular and/or irregular intervals) report information about the state of instances, network interfaces, services, etc., within virtual network 201 by sending network configuration information 208 to a network configuration information database 210.

In some embodiments, network traffic scanning system 112 can submit API calls to an API 212 provided by a compute resources virtualization platform to request information about the configuration of virtual network 201. For example, network scanning system can submit an API call requesting a list of all of the VM instances in a portion of virtual network 201 (e.g., a particular availability zone), and metadata related to the VM instances such as identifying information of the instance, identifying information of a virtual machine image used to launch the instance, identifying information of any network interfaces associated with the instance, one or more sets of security rules associated with the instance (e.g., identified with a semantically meaningful name and/or a string of characters), one or more sets of security rules associated with each network interface (e.g., identified with a semantically meaningful name or string of characters), a current state of the instance (e.g., running, pending, shutting down, etc.), identifying information of a type that describes certain properties of the instance, etc.

In some embodiments, API 212 can interact with network configuration information database 210 to retrieve the information requested by an API call from network traffic scanning system 112 (if the information exists, and if network scanning system 112 is permitted to request such information). API 212 can return account information (e.g., account metadata 114) that is responsive to the API call to network traffic scanning system 112. In some embodiments, such information can be used to identify computing devices (e.g., virtual machine instances) associated with one or more communication channels in virtual network 201 that the user wishes to monitor. Additionally, in some embodiments, such information can be used to identify one or more properties of the computing devices, such as security rules associated with the computing device. In some embodiments, network traffic scanning system 112 can use such security rules to infer the type of content that is sent to and/or from the computing device (e.g., a communication protocol that is used to communicate content).

In some embodiments, network traffic scanning system 112 can install (and/or request that the user install) network traffic agents 214 on instances within virtual network 201. In some embodiments, network traffic agents 214 can gather information about the instance on which it is installed, such as its IP address, which other devices it communicates with, information about which network interfaces it uses, information about content that it sends and/or receives via virtual network 201, etc. In some embodiments, network traffic agents 214 can report information about the virtual machine instances, communication channels, and/or network traffic in virtual network 201 to network traffic scanning system 112. In some embodiments, network traffic agents 214 can be installed using any suitable technique or combination of techniques. For example, network traffic scanning system 112, or a user associated with virtual network 201, can submit an API call that causes the compute resource virtualization platform to install the scanning agent on each VM instance specified by the API call. Note that, in some embodiments, VM instances that are implemented on different platforms (e.g., different operating systems) may require configuration of different versions of network traffic agents 214. In some embodiments, network traffic agent 214 can be installed on a single virtual machine instance of a group of virtual machine instance that perform the same function(s). For example, as shown in FIG. 2, a single network traffic agent 214 can be installed on VM instance 202, and other VM instances 202 in the cluster may not have network traffic agent 214 installed.

In some embodiments, network traffic scanning system 112 can scan traffic on virtual network 201 through between two portions of virtual network 201, such as a network gateway 216 that provides access to the portion of virtual network 201 shown in FIG. 2 and VM instance 202 using a one or more virtual machine instances 218 deployed into virtual network 201 (e.g., as a proxy for VM instance 202, as a network tap, as a packet sniffer, etc.). In some embodiments, virtual machine instance 218 can use any suitable technique or combination of techniques to scan traffic over at least a portion of the user's virtual network 201, such as techniques described above in connection with network traffic scanning system 112.

In some embodiments, each VM instance can be associated with a corresponding virtualization system, which can implement communication managers configured to process incoming and outgoing data communications for the VM instances. For example, each virtualization system can implement data logging functionality configured to analyze incoming and outgoing data communications and generate log entries describing attributes of those data communications. In a more particular example, log entries can include the sources and destinations of data communications, source and destination ports for the data communication, an identification of a virtual network interface of the virtualization system on which the data communication was received and/or transmitted, a size of the data communication, a time that the data communication was received and/or transmitted, an identification of a product instantiated into the virtual machine to which the data communication was transmitted or from which the data communication was received, and/or any other suitable information. In some embodiments, such log entries (or any information from the log entries) can be transmitted to a logging service that includes a database 220 that stores virtual network communication logs (e.g., as described above in connection with network log information database 132 of FIGS. 1A and 1B). In some embodiments, network traffic scanning system 112 can retrieve log information from database 220, and, based on the communications, can profile network traffic over at least a portion of virtual network 201. In some embodiments, network traffic scanning system 112 can access an electronic data store 222 associated with virtual network 201 and/or associated with a user of virtual network 201 for content associated with the user. For example, electronic data store 222 can be attached to one or more virtual machine instances and/or services used in connection with virtual network 201, and can be used to store documents, files, etc., that can be accessed by and/or through the virtual machine instances in virtual network 201. In such an example, network traffic scanning system 112 can (with explicit permission from the user) access electronic data store 222 to evaluate the content that may be sent over at least a portion of virtual network 201. In some embodiments, network traffic scanning system 112 can cross-reference log information (e.g., received from virtual network communication logs 220) with content in electronic data store 222 to determine which content is accessed, how often it is accessed, etc. In some embodiments, network traffic scanning system 112 can perform a similar analysis with a database (or database service) that is accessible via virtual network 201.

In some embodiments, network traffic scanning system 112 can use any suitable technique or combination of techniques to classify the content that is identified in connection with virtual network 201. For example, network traffic scanning system 112 can use natural language processing techniques to determine a language in which the content is written, to identify types of information in the content (e.g., credentials, credit card numbers, names, etc.). As another example, network traffic scanning system 112 can evaluate a packet based on regular expression matching to identify the type of content represented by the packet.

In some embodiments, in addition to evaluation the content being transmitted over at least a portion of virtual network 201, network traffic scanning system 112 can scan the configuration of at least the portion of virtual network 201 to determine which computing devices are present within the network and/or to identify communication channels over which the content can be transmitted. In some embodiments, network traffic scanning system 112 can use any suitable technique or combination of techniques to analyze the network configuration. For example, network traffic scanning system 112 can submit API calls to API 212 to request information about the configuration of virtual network 201, such as an API call requesting a list of all of the VM instances in a portion of virtual network 201 (e.g., a particular availability zone), and metadata related to the VM instances such as identifying information of the instance, identifying information of a virtual machine image used to launch the instance, identifying information of any network interfaces associated with the instance, one or more sets of security rules associated with the instance (e.g., identified with a semantically meaningful name and/or a string of characters), one or more sets of security rules associated with each network interface (e.g., identified with a semantically meaningful name or string of characters), a current state of the instance (e.g., running, pending, shutting down, etc.), identifying information of a type that describes certain properties of the instance, etc. In such an example, API 212 can interact with network configuration information database 210 to retrieve the information requested by an API call from network traffic scanning system 112, and return account information responsive to the API call. As another example, network traffic scanning system 112 can install (and/or request that the user install) scanning agents on instances within virtual network 201, which can gather information about the instance on which it is installed, such as its IP address, which other devices it communicates with, information about which application(s) are being executed by the virtual machine instance, etc. As yet another example, network traffic scanning system 112 can scan virtual network 201 through network gateway 216 using any suitable technique or combination of techniques. In a more particular example, network traffic scanning system 112 can use one or more discovery protocols (e.g., by performing a reverse Domain Name System ("DNS") lookup, a ping sweep—e.g., by sending Internet Control Message Protocol ("ICMP") echo requests, ICMP timestamp requests, ICMP address mask requests—across a range of IP addresses corresponding to virtual network 201, etc.). As another more particular example, upon identifying devices in virtual network 201, network traffic scanning system 112 can perform a port scan in connection with each device. As yet another more particular example, network traffic scanning system 112 can communicate with each device found on the network to determine the operating system and other characteristics of the device. In some embodiments, network traffic scanning system 112 can use any suitable software for scanning virtual network 201, such as Network Mapper ("Nmap") software available from nmap (dot) org. As still another example, network traffic scanning system 112 and/or a user associated with virtual network 201 can deploy one or more virtual machine instances (e.g., VM instance 218) into virtual network 201 to perform a network scan from within virtual network 201 using any suitable technique or combination of techniques in addition to and/or in lieu of any of the techniques described above, such as performing a address resolution protocol ("ARP") sweep, to discover other hosts on a local network. In some embodiments, network traffic scanning system 112 can use information about the computing devices on virtual network 201 to infer the types of content that are sent to and/or from the computing device. For example, based on the privileges associated with a particular computing device, network traffic scanning system 112 can infer which other computing devices and/or services that computing device can interact with, and can use that information to infer the types of content that is sent and/or received based on information about the other computing device and/or service. Note that although network traffic scanning system 112 is described as gathering information about traffic over virtual network 201 in connection with FIG. 2, network scanning system 112 can scan one or more non-virtual portions of network 104 that are physically controlled by the user (e.g., by the user directly or through a provider of physical compute resources). Further, in some embodiments, honeypots can be launched on and/or can send traffic to, such physical devices (e.g., outside of virtual network 201 but within network 104).

Figure 3:
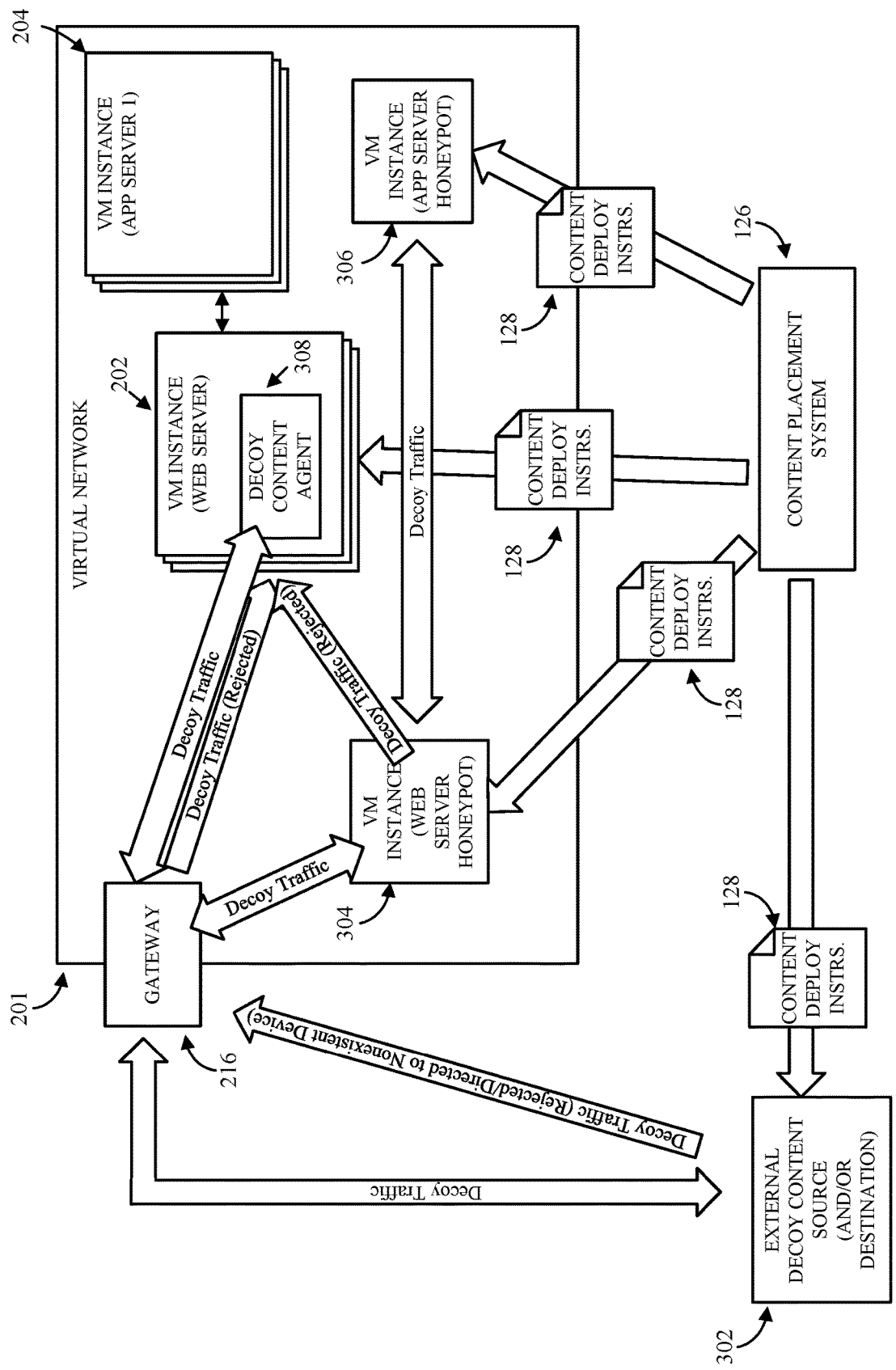
FIG. 3 is a diagram of an example of a portion a virtual network being used to transmit decoy content in accordance with some embodiments of the disclosed subject matter.

FIG. 3 shows an example 300 of a portion a virtual network being used to transmit decoy content in accordance with some embodiments of the disclosed subject matter. As shown in FIG. 3, virtual network 201 can include various devices that can be used to provide access to a web page (e.g., via VM instances 202), an application (e.g., via VM instances 202), etc. As shown in FIG. 3, content placement system 126 can send content deployment instructions 128 to various devices to cause the devices to send decoy content over at least a portion of virtual network 201. For example, content placement system 126 can send content deployment instructions 128 to an external decoy content source 302. In such an example, external decoy content source 302 (e.g., a server, a virtual machine instance outside of virtual network 201, a personal computer, a mobile computing device, etc.) can send decoy content to one or more destinations within virtual network 201 (e.g., via gateway 216) based on content deployment instructions 128 received from content placement system 126. In a more particular example, external decoy content source 302 can be instructed to send decoy content to a VM instance 304 that is configured as a honeypot that acts as a web server and/or to VM instance(s) 202. In some embodiments, decoy content sent to a user's computing device (e.g., VM instance 202) can be sent using the Transmission Control Protocol ("TCP") without first establishing a connection such that the packets are not accepted by VM instance 202. Additionally or alternatively, in some embodiments, decoy content source 302 can send decoy traffic to a destination on virtual network 201 that does not correspond to any computing device. In some embodiments, such decoy traffic can be rejected by gateway 216 and/or can be received by a routing device in virtual network 201.

As another example, content placement system 126 can send content deployment instructions 128 to VM instance 304 and/or to VM instance 306 that is configured as a honeypot that acts as an application server. As shown in FIG. 3, VM instance 304 can send decoy content to an external destination, such as external decoy content source 302, which can additionally or alternatively be a remote endpoint that can act as an intended destination for decoy traffic originating within virtual network 201. In a more particular example, VM instance 304 can be instructed to send decoy content to an internal destination, such as VM instance(s) 202 and/or VM instance 306 (which may or may not also be sending decoy content to VM instance 304). Additionally or alternatively, decoy content can be sent between VM instances 304 and 306 based on content deployment instructions 128.

As yet another example, content placement system 126 can send content deployment instructions 128 to one or more decoy content agents 308 installed on a VM instance (or other computing device, such as a physical server, a personal computer, etc.) in virtual network 201 (and/or in a non-virtual network).

Figure 4:
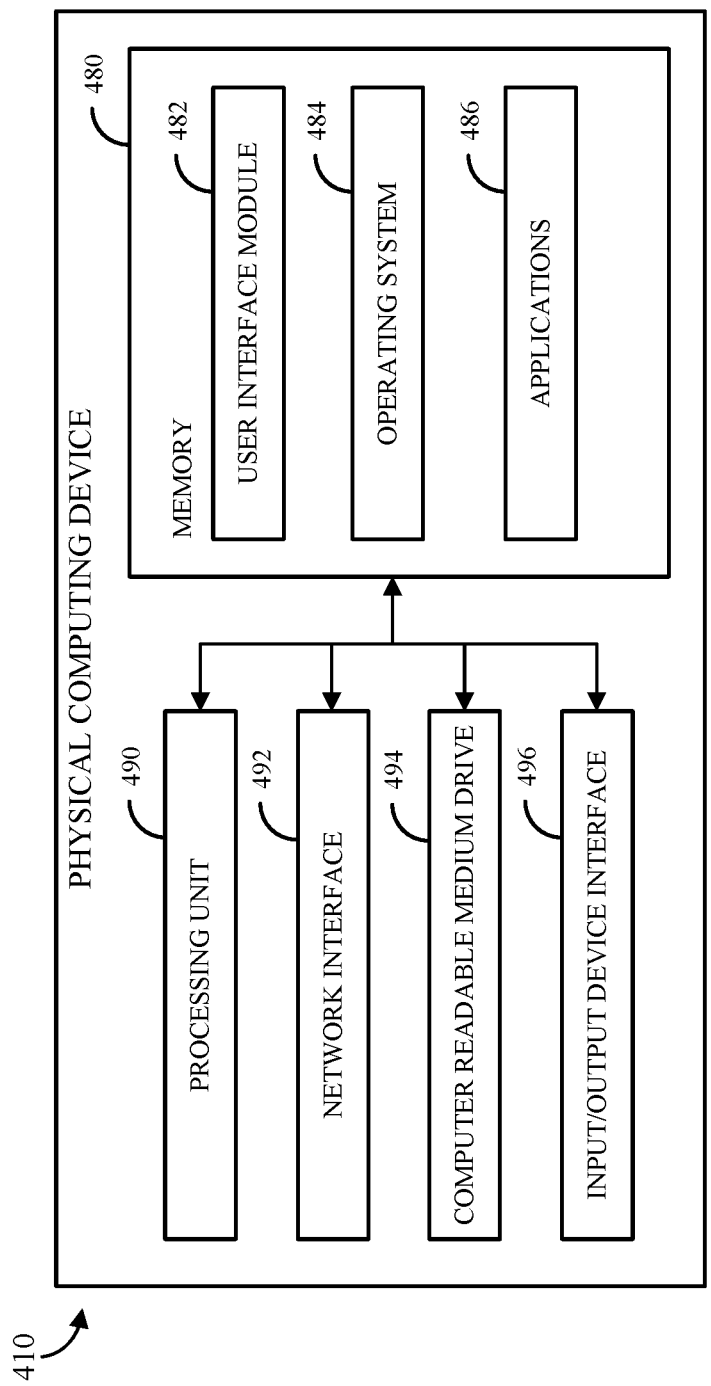
FIG. 4 is a diagram of an example of a general architecture of a physical computing device that can be used to provide access to at least a portion of the mechanisms described herein to configure and/or deploy customized decoy content over at least a portion of a user's network in accordance with some embodiments of the disclosed subject matter.

FIG. 4 shows an example of a general architecture of a physical computing device (e.g., a server) that can be used to provide access to at least a portion of the mechanisms described herein (e.g., as a portion of compute resources 102, as a portion of frontend 110, as a portion of network traffic scanning system 112, as a portion of decoy content configuration system 120, as a portion of content placement system 126, etc.) to configure and/or deploy customized decoy content over at least a portion of a user's network in accordance with some embodiments of the disclosed subject matter. The general architecture of physical computing device 410 depicted in FIG. 4 includes an arrangement of computer hardware and/or software modules that can be used to implement aspects of the disclosed subject matter. The hardware modules can be implemented with physical electronic devices, as described below, and physical computing device 410 can include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIGS. 1A and 1B. As illustrated, physical computing device 410 includes a processing unit 490, a network interface 492, a computer readable medium drive 494, and an input/output device interface 496, all of which can communicate with one another by way of a communication bus. Network interface 492 can provide connectivity to one or more networks or computing systems. Processing unit 490 can thus receive information and instructions from other computing systems or services via communication network 108. Processing unit 490 can also communicate to and from memory 480 and further provide output information for an optional display (not shown) via the input/output device interface 496. The input/output device interface 496 can also accept input from one or more optional input device (not shown).

Memory 480 can contain computer program instructions (e.g., grouped as modules in some embodiments) that processing unit 490 executes in order to implement one or more aspects of the disclosed subject matter. In some embodiments, memory 480 can include RAM, ROM, EEPROM, one or more flash drives, one or more hard disks, one or more solid state drives, one or more optical drives, etc., any other suitable persistent, auxiliary, or non-transitory computer-readable media, or any suitable combination thereof. Memory 480 can store an operating system 484 that provides computer program instructions for use by processing unit 490 in the general administration and operation of the disclosed subject matter. Memory 480 can further include computer program instructions and other information for implementing aspects of the disclosed subject matter. For example, in some embodiments, memory 480 can include a user interface module 482 that generates user interfaces (and/or instructions therefor) for display upon a computing device, e.g., via a navigation and/or browsing interface such as a browser or application installed on the computing device. In addition, memory 480 can include and/or communicate with one or more data repositories (not shown), for example, to retrieve decoy content, software images, virtual machine images, libraries, virtual network profile information, etc.

In some embodiments, memory 480 can include one or more applications 486 that may be executed by processing unit 490 to provide, for example, one or more of a virtualization system, a virtual machine instance, an API made available by frontend 110, a network traffic scanning and/or analysis application (e.g., to implement at least a portion of network traffic scanning system 112), a decoy content configuration application (e.g., to implement at least a portion of decoy content configuration system 120), a content placement application (e.g., to implement at least a portion of content placement system 126), etc. For example, in some embodiments, physical computing device 410 can execute a virtual machine instance that can implement a web server in virtual network 201, a proxy in virtual network 201, etc. In a more particular example, applications 486 can include one or more software images and/or virtual machine images that can be used to launch one or more virtual machines and/or software applications that can be executed by processing unit 490 to implement one or more portions of the disclosed subject matter.

Figure 5:
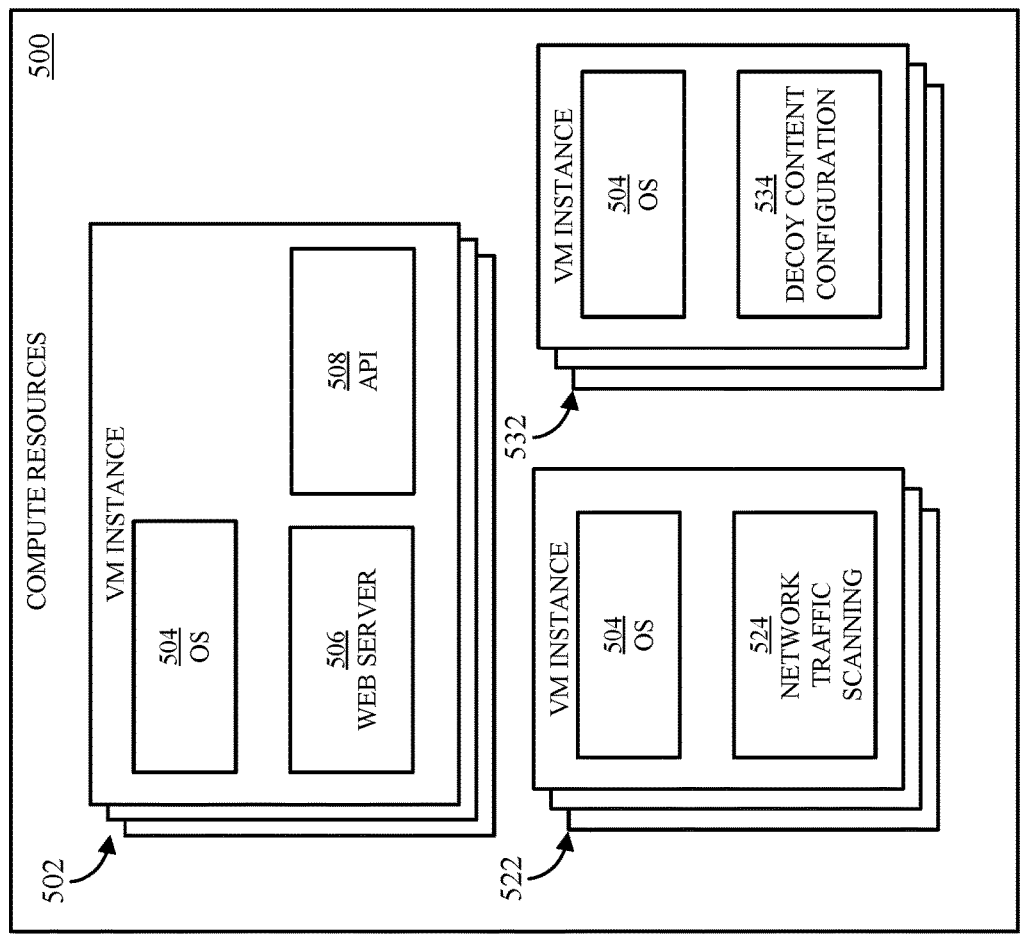
FIG. 5 is a diagram of an example of a portion of user compute resources that can be used to implement one or more portions of the system shown in FIG. 1 in accordance with some embodiments of the disclosed subject matter.

FIG. 5 shows an example of a portion of compute resources 500 that can be used to implement one or more portions of system 100 shown in FIG. 1 (e.g., frontend 110, network traffic scanning system 112, decoy content configuration system 120, etc.) in accordance with some embodiments of the disclosed subject matter. In some embodiments, virtual machine instances deployed in compute resources 500 can be provided through a compute service that provides access to virtual machine instances that can launch and execute a variety of applications from software images. For example, in some embodiments, compute resources 500 can include any suitable number of virtual machine instances, such as virtual machine instances 502, 522, and 532. In some embodiments, a "virtual machine instance" can refer to a specific allocation of virtual computing resources that has the properties of a particular virtual machine (VM) and is configured to launch and run software. For example, a virtual machine instance can be launched from a virtual machine image, which can, for example, represent the entire state of a virtual machine instance at the time it was imaged, such that a virtual machine instance and any software applications installed on the virtual machine instance can be restored to that point by restoring/launching the virtual machine image. As another example, software can be launched by a virtual machine instance using one or more software images, which can, for example, represent the entire state of a software application at the time it was imaged, such that the software application can be restored to this point by restoring/launching the software image. In some embodiments, a virtual machine instance 502 can execute software to provide the functionality of a web server based on a virtual machine image and/or one or more software images provided by a user of the virtual machine instance (e.g., a service provider associated with the decoy content service).

As shown in FIG. 5, in some embodiments, VM instances 502 can have an OS 504, software 506 for providing web server functionality, and software 508 for providing one or more APIs that can be exposed to users of the decoy content service (e.g., as part of frontend 110). For example, VM instances 502 can receive requests from users (e.g., from compute resources 102) of the decoy content service with information about the user's virtual network, the user's communication channels, protocols that are used, etc., as an API call that is evaluated using API 508. In such an example, API 508 can evaluate the API call, and based on the contents of the API call, can cause network traffic scanning system 112 (e.g., implemented at least in part by VM instances 522) to generate profile information about network activity on the user's virtual network.

In some embodiments, VM instance 522 can have OS 504, and software 524 for providing a network traffic scanning application that can be used to implement at least a portion of network traffic scanning system 112. For example, network traffic scanning 524 can information about traffic on a user's virtual network (e.g., as described above in connection with FIG. 2), can evaluate the information (e.g., to determine properties of the content sent over the virtual network, properties of the communication channels, etc.) to generate profile information about traffic on the user's virtual network, and can submit profile information to be used by, for example, decoy content configuration system 120 (e.g., implemented at least in part by VM instances 532).

In some embodiments, VM instance 532 can have OS 504, software 534 for providing a decoy content configuration application that can be used to implement at least a portion of decoy content configuration system 120. For example, VM instance 532 can receive profile information about traffic on the user's virtual network, can use the profile information to select decoy content to be sent over at least one communication channel on the user's virtual network, and can customize the selected decoy content by including identifying information that can be used to positively identify the decoy content when the identifying information is used (e.g., submitted as login credentials to an authentication system).

In some embodiments, compute resources 102 (and/or any other suitable compute resources associated with the user of compute resources 102) can be provided using one or more VM instances executed by compute resources 500. For example, the user can launch one or more VM instances for providing a web server to host a web page, one or more instances for providing access to an application server that provides an application via the web page, etc. Additionally or alternatively, in some embodiments, compute resources associated with the user can be provided by one or more physical computing devices owned by the user (e.g., in a data center operated by, or on behalf of the user), by a different compute service, etc. In some embodiments, compute resources 500 can represent any suitable number of physical computing devices (e.g., servers) located in any suitable number of locations (e.g., one or more data centers, which may or may not be interconnected with low latency links). In some embodiments, information can be distributed amongst multiple VM instances providing the same or similar functionality (e.g., VM instances 502) using a load balancer (and/or any other suitable technique or combination of techniques).

Figure 6:
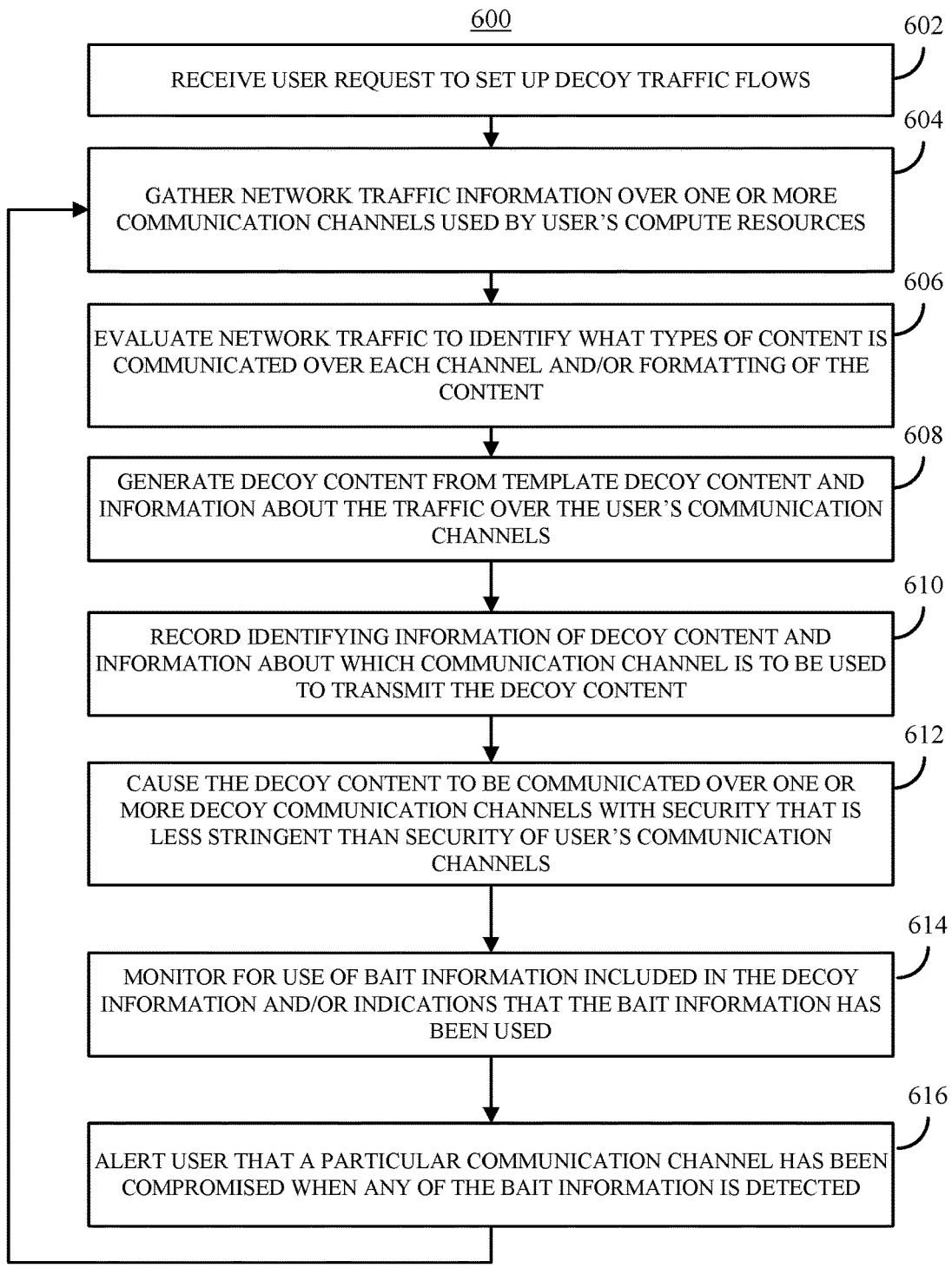
FIG. 6 is a diagram of an example process for configuring and deploying customized decoy content in a network in accordance with some embodiments of the disclosed subject matter.

FIG. 6 shows an example 600 of a process for configuring and deploying customized decoy content in a network in accordance with some embodiments of the disclosed subject matter. As shown in FIG. 6, at 602, process 600 can receive a user request to set up one or more decoy traffic flows in connection with the user's network. For example, frontend 110 can receive a web service request identifying a user account and including a request to use the decoy content service. In some embodiments, the request can also include information identifying one or more portions of the user's virtual network to be monitored using the decoy traffic flows (e.g., regions, availability zones, subnets, etc.). In some embodiments, process 600 can determine whether a user and/or computing device associated with a request is authorized to submit such requests. For example, process 600 can determine whether the user and/or computing device has valid permissions to make such a request on behalf of the user associated with the compute resources. As another example, process 600 can determine whether the user associated with the compute resources is authorized to use the decoy content service (e.g., whether the user has subscribed to the service). In some embodiments, if a user is not authorized, process 600 can end and/or can indicate that the user and/or computing device making the request does not have authorization to submit the request (and may prompt the user to subscribe to the service). Additionally, at 602, process 600 can receive any other information setting up the service, for example, as described above in connection with FIG. 1A.

At 604, process 600 can gather network traffic information over one or more communication channels used by the user's compute resources using any suitable technique or combination of techniques. For example, process 600 can use one or more techniques described above in connection with FIGS. 1A, 1B, and 2 to gather network traffic information. In some embodiments, process 600 can reconstruct content based on intercepted packets corresponding to the content if the packets are not encrypted and/or if the device intercepting the content can decrypt the content (e.g., based on a certificate or private key). Additionally or alternatively, process 600 can identify a particular communication channel, and can prompt a user to provide a sample of the type of content that is typically transmitted over the communication channel.

At 606, process 600 can evaluate the network traffic to identify what types of content are being communication over each channel and/or formatting information about how the content is sent (e.g., a communication protocol that is used). For example, process 600 can use one or more techniques described above in connection with FIGS. 1A, 1B, and 2 to evaluate the content being transmitted over a particular channel. Additionally, in some embodiments, process 600 can evaluate information about how often content is sent over a particular communication channel, the rate at which packets are being sent, how long a particular session of sending content lasts, etc.

At 608, process 600 can generate decoy content based on a repository of template decoy content and information about the traffic over the communication channels being used to transmit information in the user's network using any suitable technique or combination of techniques. For example, process 600 can use techniques described above in connection with decoy content configuration system 120 of FIG. 1A. Additionally or alternatively, a user can submit decoy content. As described above in connection with FIGS. 1A and 1B, process 600 can include details in the decoy content that can be used to positively identify the decoy content that was intercepted and/or to act as bait information for a malicious user.

At 610, process 600 can record identifying information of the decoy content generated at 608, and, in some embodiments, information about which communication channel is to be used to transmit the decoy content. In some embodiments, process 600 can use any suitable technique or combination of techniques to record such information. For example, as described above in connection with content placement system 126, process 600 can store information about the decoy content in a database (e.g., deployed decoy content information database 136).

At 612, process 600 can cause at least a portion of the decoy content generated at 608 to be communicated over one or more decoy communication channels. For example, as described above in connection with FIGS. 1A and 3, process 600 can send instructions to one or more devices to send the selected decoy content over at least one communication channel. In some embodiments, process 600 can cause the decoy content to be sent using security protocols that are less stringent than security protocols associated with communication channels used in the production environment of the user's network. For example, if a particular production communication channel generally uses HTTPS with strong encryption, process 600 can cause the decoy content to be sent using HTTP, HTTPS without encryption, HTTPS with weak encryption, HTTPS using an encryption protocol that is known to be compromised, etc.

At 614, process 600 can monitor one or more locations for use of bait information that was included in the decoy information deployed at 612 and/or indications that the bait information has been used. For example, as described above in connection with FIG. 1B, process 600 can determine whether information that is submitted to an authentication system corresponds to bait information that was included in decoy content, and can determine which communication channel that decoy content was sent over. In some embodiments, process 600 can monitor one or more locations (e.g., forums) in which malicious users may share and/or sell information that has been exfiltrated, such as login credentials, credit card numbers, etc. In such embodiments, process 600 can compare information found at such locations to stored identifying information to determine whether a particular communication channel has been compromised.

At 616, process 600 can generate an alert for a user that indicates that a particular communication channel was compromised when use of the bait information is detected at 614. For example, as described above in connection with FIG. 1B, process 600 can make the information in the alert available to the user using any suitable technique or combination of technique, such as through email, through the user's account, using a push notification, etc.

In some embodiments, process 600 can return to 604 to determine whether additional instructions designating further portions of the user's virtual network for monitoring have been received, and/or to scan traffic on one or more additional portions of the user's virtual network at 606. For example, in some embodiments, process 600 can scan traffic on portions of the user's virtual network when the different portions of the network are physically isolated from each other. Additionally or alternatively, in some embodiments, process 600 can re-scan portions of the user's virtual network that have already been scanned and/or portions that are associated with flows of decoy content generated by process 600. In some embodiments, process 600 can re-scan portions of the user's virtual network that have already been scanned in response to a triggering event. For example, process 600 can (with explicit permission from the user) receive log information about changes to at least a portion of the user's virtual network, such as deployment of software applications to one or more virtual machine instances, changes to add and/or remove virtual machine instances from the virtual network (e.g., changes in the number of virtual machine instances in a cluster performing the same function, of changes other than scaling up or down the number of virtual machine instances in a cluster). As another example, process 600 can (with explicit permission from the user) receive log information about network activity on at least a portion of the user's virtual network, and can monitor the network activity for changes that may indicate a change in the character of the network traffic flowing over at least a portion of the user's network. In a more particular example, process 600 can use anomaly detection techniques to determine whether a particular portion of network activity is "normal" or "abnormal" (e.g., different than an established pattern of network activity).

In accordance with some embodiments of the disclosed subject matter, a system is provided, the system comprising: an electronic data store configured to store preconfigured decoy content; one or more hardware computing devices in communication with the electronic data store and configured to execute specific computer-executable instructions that upon execution cause the system to: receive a request to analyze at least a portion of a virtual network associated with a user; receive network traffic information representing content sent over at least the portion of the virtual network; analyze the content to determine at least a first type of content included in the network traffic; generate decoy content of the first type using the preconfigured decoy content, the decoy content including identifying information; cause the decoy content to be sent over the virtual network; receive an indication that the identifying information was accessed; and generate an alert indicating that the decoy content was accessed by an unauthorized party.

In some embodiments, the one or more hardware computing devices are further configured to execute specific computer-executable instructions that upon execution cause the system to: analyze the network traffic to determine at least a first communication protocol used to send the network traffic in the virtual network, wherein the first communication protocol is associated with first security rules; and cause the decoy content to be sent via a second communication protocol having second security rules that are less secure than the first security rules.

In some embodiments, the identifying information corresponds to at least a portion of a login credential, and wherein the one or more hardware computing devices are further configured to execute specific computer-executable instructions that upon execution cause the system to: receive an indication that at least the portion of the login credential was used; and generate a message indicating that at least the portion of the login credential was used.

In some embodiments, the one or more hardware computing devices are further configured to execute specific computer-executable instructions that upon execution cause the system to: receive permission from the user to access log information for at least a portion of the virtual network; subsequent to being granted permission to access the log information, analyze the log information to determine that content of the first type was sent over the virtual network.

In accordance with some embodiments of the disclosed subject matter, a system is provided, the system comprising one or more hardware computing devices configured to execute specific computer-executable instructions that upon execution cause the one or more hardware computing devices to: receive a request to monitor at least a portion of a virtual network associated with a user; receive information about network traffic sent in the virtual network; generate decoy content, including identifying information, based on the information about network traffic; cause the decoy content to be sent in the virtual network; determine, based on the identifying information, that at least the portion of the decoy content was used; and in response to determining that the portion of the decoy content was used, alert the user that the decoy content was accessed.

In some embodiments, execution of the specific computer-executable instructions further causes the one or more hardware computing devices to cause the decoy content to be sent according to an insecure communication protocol.

In some embodiments, the insecure communication protocol lacks encryption.

In some embodiments, execution of the specific computer-executable instructions further causes the one or more hardware computing devices to: determine that the network traffic was sent using Secure Hypertext Transfer Protocol ("HTTPS"); and in response to determining that the network traffic was sent using HTTPS, cause the decoy content to be sent using Hypertext Transfer Protocol ("HTTP").

In some embodiments, execution of the specific computer-executable instructions further causes the one or more hardware computing devices to cause the decoy content to be sent from an endpoint external to the virtual network to an address within the virtual network.

In some embodiments, the identifying information corresponds to a uniquely identifiable string of characters, and wherein execution of the specific computer-implemented instructions further causes the one or more hardware computing devices to: receive, from an authentication system, an indication that the identifying information was submitted to the authentication system; and generate the alert based on the indication that the identifying information was submitted.

In some embodiments, the identifying information corresponds to a code for redeeming a gift card, and wherein execution of the specific computer-executable instructions further causes the one or more hardware computing devices to: receive an indication that an attempt was made to use the code to redeem the gift card; and generate the alert based on the indication.

In accordance with some embodiments of the disclosed subject matter, a method is provided, the method comprising: generating decoy content, including identifying information, based on information about network traffic in a virtual network associated with a user; causing the decoy content to be sent in the virtual network; determining, based at least in part on the identifying information, that at least the portion of the decoy content was used; and in response to determining that the portion of the decoy content was used, alerting the user that the decoy content was used.

In some embodiments, the method further comprises causing the decoy content to be sent in the virtual network using a communication protocol that is less secure than a communication protocol used to send a portion of the network traffic.

In some embodiments, the method further comprises: determining that at least the portion of the network traffic was encrypted; and causing the decoy content to be sent without encryption.

In some embodiments, the method further comprises causing the decoy content to be sent using less secure encryption than encryption that was used to send at least a portion of the network traffic.

In some embodiments, the method further comprises causing the decoy content to be sent to an address within the virtual network that does not correspond to a device within the virtual network.

In some embodiments, the method further comprises: causing the decoy content to be sent to a computing device within the virtual network; and formatting the decoy content to be rejected by the computing device.

In some embodiments, formatting the decoy content comprises causing the decoy content to be sent without first establishing a Transmission Control Protocol ("TCP") connection with the computing device.

In some embodiments, the method further comprises: causing a virtual machine to be launched within the virtual network; and causing the virtual machine to send the decoy content to a computing device within the virtual network.

In some embodiments, the method further comprises: recording an identity of a computing device in the virtual network to which the decoy content was sent; and alert the user, based on the identifying information and the identity of the computing device, that communications to the computing device were compromised.

Although subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIG. 6 can be executed or performed in any order or sequence not limited to the order and sequence shown and described in the figures. Also, some of the above steps of the processes of FIG. 6 can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
   an electronic data store configured to store preconfigured decoy content;
   one or more hardware computing devices in communication with the electronic data store and configured to execute specific computer-executable instructions that upon execution cause the system to:
      receive a request to analyze at least a portion of a virtual network implemented in a production computing environment associated with a user, the virtual network providing one or more production communication channels utilized by the virtual network to send content;
      receive network traffic information representing content sent over at least the portion of the virtual network using the one or more production communication channels;
      analyze the content to determine at least a first type of content included in the network traffic;
      generate decoy content of the first type using the preconfigured decoy content, the decoy content including identifying information;
      cause the decoy content to be sent over the virtual network;
      receive an indication that the identifying information was accessed; and
      generate an alert indicating that the decoy content was accessed by an unauthorized party.

2. The system of claim 1, wherein the one or more hardware computing devices are further configured to execute specific computer-executable instructions that upon execution cause the system to:
   analyze the network traffic to determine at least a first communication protocol used to send the network traffic in the virtual network, wherein the first communication protocol is associated with first security rules; and
   cause the decoy content to be sent via a second communication protocol having second security rules that are less secure than the first security rules.

3. The system of claim 1, wherein the identifying information corresponds to at least a portion of a login credential, and wherein the one or more hardware computing devices are further configured to execute specific computer-executable instructions that upon execution cause the system to:
   receive an indication that at least the portion of the login credential was used; and
   generate a message indicating that at least the portion of the login credential was used.

4. The system of claim 1, wherein the one or more hardware computing devices are further configured to execute specific computer-executable instructions that upon execution cause the system to:
   receive permission from the user to access log information for at least a portion of the virtual network;
   subsequent to being granted permission to access the log information, analyze the log information to determine that content of the first type was sent over the virtual network.

5. A system, comprising one or more hardware computing devices configured to execute specific computer-executable instructions that upon execution cause the one or more hardware computing devices to:
   receive a request to monitor at least a portion of a virtual network implemented in a production computing environment associated with a user, the virtual network providing one or more production communication channels utilized by the virtual network to send content;
   receive information about network traffic sent in the virtual network using the one or more production communication channels;
   generate decoy content, including identifying information, based on the information about network traffic;
   cause the decoy content to be sent in the virtual network;
   determine, based on the identifying information, that at least the portion of the decoy content was used; and
   in response to determining that the portion of the decoy content was used, alert the user that the decoy content was accessed.

6. The system of claim 5, wherein execution of the specific computer-executable instructions further causes the one or more hardware computing devices to cause the decoy content to be sent according to an insecure communication protocol.

7. The system of claim 6, wherein the insecure communication protocol lacks encryption.

8. The system of claim 7, wherein execution of the specific computer-executable instructions further causes the one or more hardware computing devices to:
   determine that the network traffic was sent using Secure Hypertext Transfer Protocol ("HTTPS"); and
   in response to determining that the network traffic was sent using HTTPS, cause the decoy content to be sent using Hypertext Transfer Protocol ("HTTP").

9. The system of claim 5, wherein execution of the specific computer-executable instructions further causes the one or more hardware computing devices to cause the decoy content to be sent from an endpoint external to the virtual network to an address within the virtual network.

10. The system of claim 5, wherein the identifying information corresponds to a uniquely identifiable string of characters, and wherein execution of the specific computer-implemented instructions further causes the one or more hardware computing devices to:
   receive, from an authentication system, an indication that the identifying information was submitted to the authentication system; and
   generate the alert based on the indication that the identifying information was submitted.

11. The system of claim 5, wherein the identifying information corresponds to a code for redeeming a gift card, and wherein execution of the specific computer-executable instructions further causes the one or more hardware computing devices to:
   receive an indication that an attempt was made to use the code to redeem the gift card; and
   generate the alert based on the indication.

12. A method, comprising:
   generating decoy content, including identifying information, based on information about network traffic in a virtual network implemented in a production computing environment associated with a user, the virtual network providing one or more production communication channels utilized by the virtual network to send content;
   causing the decoy content to be sent in the virtual network;
   determining, based at least in part on the identifying information, that at least the portion of the decoy content was used; and
   in response to determining that the portion of the decoy content was used, alerting the user that the decoy content was used.

13. The method of claim 12, further comprising causing the decoy content to be sent in the virtual network using a communication protocol that is less secure than a communication protocol used to send a portion of the network traffic.

14. The method of claim 13, further comprising:
   determining that at least the portion of the network traffic was encrypted; and
   causing the decoy content to be sent without encryption.

15. The method of claim 13, further comprising causing the decoy content to be sent using less secure encryption than encryption that was used to send at least a portion of the network traffic.

16. The method of claim 12, further comprising causing the decoy content to be sent to an address within the virtual network that does not correspond to a device within the virtual network.

17. The method of claim 12, further comprising:
   causing the decoy content to be sent to a computing device within the virtual network; and
   formatting the decoy content to be rejected by the computing device.

18. The method of claim 17, wherein formatting the decoy content comprises causing the decoy content to be sent without first establishing a Transmission Control Protocol ("TCP") connection with the computing device.

19. The method of claim 12, further comprising:
   causing a virtual machine to be launched within the virtual network; and
   causing the virtual machine to send the decoy content to a computing device within the virtual network.

20. The method of claim 12, further comprising:
   recording an identity of a computing device in the virtual network to which the decoy content was sent; and
   alert the user, based on the identifying information and the identity of the computing device, that communications to the computing device were compromised.

* * * * *